United States Patent [19]

McGinnis et al.

[11] 4,208,690

[45] Jun. 17, 1980

[54] CIRCUIT BREAKER HAVING AN ELECTRONIC FAULT SENSING AND TRIP INITIATING UNIT

[75] Inventors: James P. McGinnis, Cedar Rapids; Henry J. Zylstra, Alburnette, both of Iowa

[73] Assignee: Square D Company, Palatine, Ill.

[21] Appl. No.: 886,963

[22] Filed: Mar. 15, 1978

[51] Int. Cl.² ............................................. H02H 3/28
[52] U.S. Cl. ................................................. 361/48
[58] Field of Search ........................... 361/42, 94–98; 340/638

[56] References Cited

U.S. PATENT DOCUMENTS

| 3,826,951 | 7/1974 | Mater et al. | 361/100 |
| 4,004,201 | 1/1977 | De Puy | 340/638 X |

Primary Examiner—Harry E. Moose, Jr.
Attorney, Agent, or Firm—Larry I. Golden; Richard T. Guttman; Norton Lesser

[57] ABSTRACT

A circuit breaker having an electronic fault sensing and trip initiating unit which provides increased versatility and ability to coordinate the circuit breaker with other interrupting and protective devices in a wide variety of electrical distribution systems. Electronic circuits and components are provided to vary the ampere rating of the breaker, to adjust current carrying capacity, to provide a long time delay trip, a short time delay trip and an instantaneous trip depending on the amplitude of high fault currents, to provide a ground fault trip, to shorten or lengthen the trip time for short time delay faults and for ground faults, and to provide shunt trip capability. The tripping mechanism is magnetic and mechanical, and includes a plunger movable between a trip and non-trip position controlled by an electronic switch in the electronic circuitry, and a toggle mechanism which is unlatched by the plunger when it moves to the trip position. A bimetal trip mechanism is provided as back-up protection if the ambient temperature not sensed by the electronic circuitry exceeds a predetermined level.

4 Claims, 30 Drawing Figures

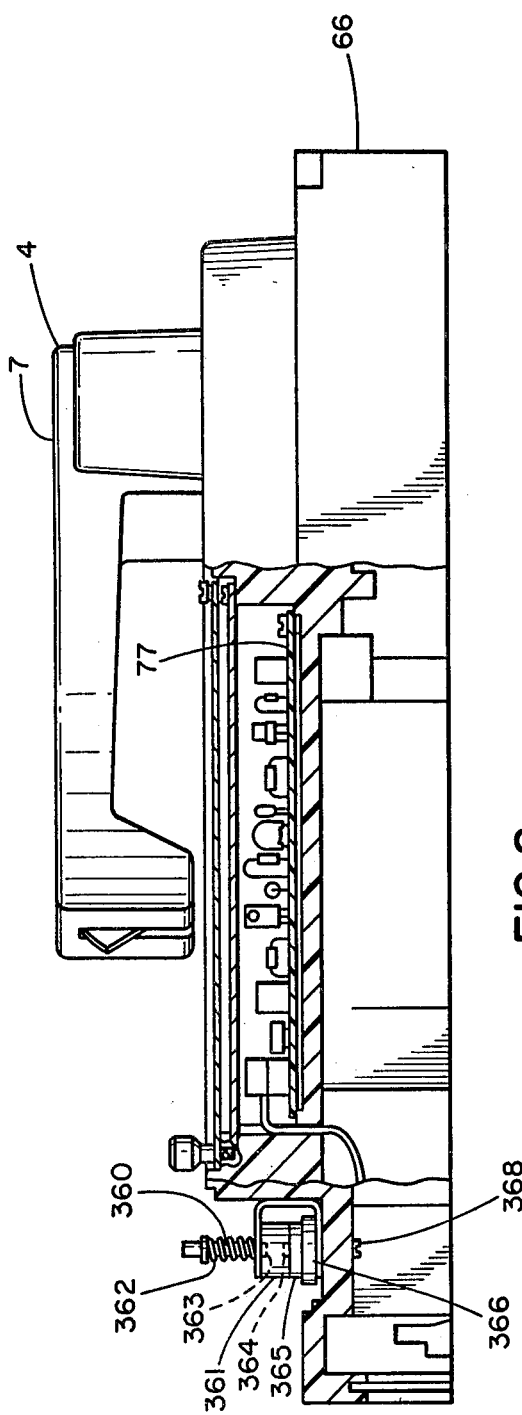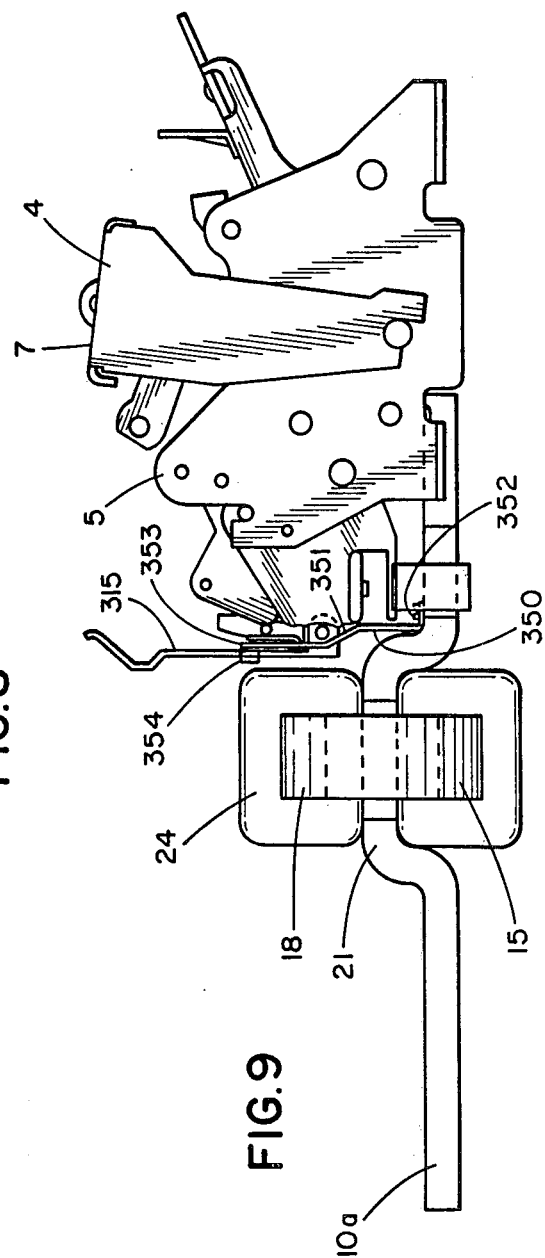
FIG.8
FIG.9

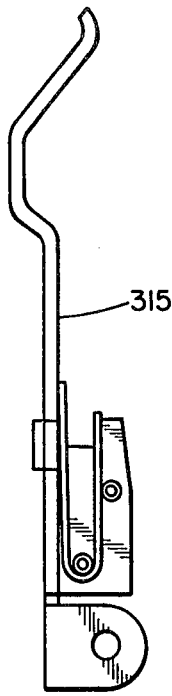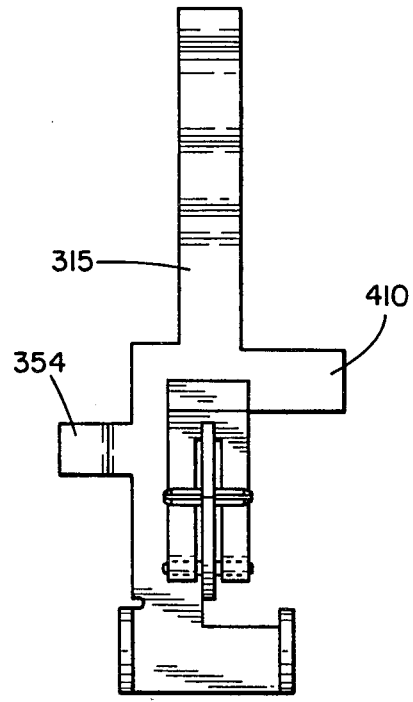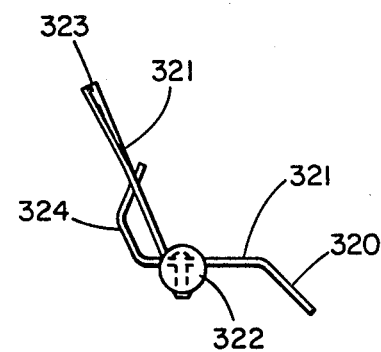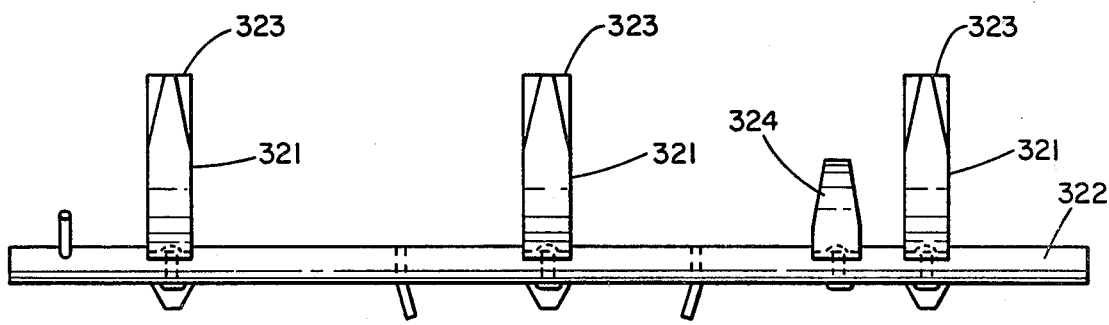
FIG.17  FIG.18  FIG.20
FIG.19

CIRCUIT BREAKER HAVING AN ELECTRONIC FAULT SENSING AND TRIP INITIATING UNIT

BACKGROUND OF THE INVENTION

This invention relates to the field of circuit breakers for protection of electrical circuits, and in particular to those having adjustment means to vary certain performance characteristics of the breaker, such as its ampere rating, trip times and the like.

Circuit breakers have been in use for many years to protect electrical circuits in homes as well as in commercial and industrial establishments, and wherever electricity is used. The typical circuit breaker includes a mechanical tripping mechanism and magnetic or thermal triggering means to open the circuit on occurrence of an overcurrent fault of a pre-selected magnitude. The tripping level of such circuit breakers is usually set by the manufacturer and either cannot be changed by the user or if adjustment of the trip level is provided it can only be done within a relatively limited range and without knowing precisely what the change is. Similarly, the ampere rating and frame size of each prior art breaker is established by the manufacturer, so a circuit breaker of one frame size for an electrical distribution system of a given ampere and voltage rating could not be properly interchanged for use in an electrical system of different ampere and voltage ratings. The time between occurrence of a fault and tripping of the breaker is typically determined by such things as the size and material of the bimetal element in thermal trip mechanisms, and by such things as the rating of the trip coil and the like in magnetic trip mechanisms. The trip time delay could be varied somewhat in such prior art breakers by such things as moving the thermal trip bimetal closer to or further from the delatching member and the like, varying the magnetic gap in the magnetic trip mechanisms, and so on. Such changes however were within a limited range, and the amount of change could not be determined easily and precisely. Significant changes in trip times would often require changing of the components themselves such as the bimetal element, trip coil, and the like.

It is desirable to provide a circuit breaker which has greater flexibility, and in which the ampere ratings, pick-up levels, trip time delay, and the like can all be varied easily and precisely to enable use of a single breaker in a wide variety of electrical distribution systems. For example, when used as a main circuit breaker in a distribution system having a number of branches fed by separate branch circuit breakers, it would be desirable to be able to adjust the pick-up level and time delay of the main breaker to a precise point at which the downstream branch breakers are able to clear low level faults but at which the main breaker will interrupt higher level faults which would otherwise damage the distribution system or result in a fire or explosion.

The circuit breaker in accordance with the present invention enables precise adjustment of such characteristics of ampere rating, pick-up level, time delay and the like by combining an electronic fault sensing and trip initiating unit with a magnetic and mechanical tripping mechanism. Such electronic, magnetic and mechanical combination facilitates inclusion of ground fault capability and shunt trip capability, which are normally higher cost accessories when added to prior art circuit breakers.

SUMMARY OF THE INVENTION

It is an object of the invention to provide a circuit breaker having an electronic fault sensing and trip initiating unit, including adjustment means therein to vary and precisely set the ampere rating of the breaker, the pick-up level, and the time delay between occurrence of a given fault condition and tripping of the breaker to interrupt the circuit.

It is an object of the invention to provide a circuit breaker having an electronic fault sensing and trip initiating unit in combination with a magnetic and mechanical tripping mechanism to provide convenient and precise adjustment of the performance characteristics of the breaker while retaining its reliability and durability characteristics.

It is an object of the invention to provide a circuit breaker having an electronic fault sensing and trip initiating unit, and which includes a thermal trip mechanism to protect against ambient temperature conditions which may not be sensed by the electronic fault sensing unit.

It is an object of the invention to provide a circuit breaker having an electronic fault sensing and trip initiating unit which includes a long time delay trip circuit, a short time delay trip circuit, and an instantaneous trip circuit.

It is an object of the invention to provide a circuit breaker having an electronic fault sensing and trip initiating unit which includes a ground fault trip circuit.

It is an object of the invention to provide a circuit breaker having an electronic fault sensing and trip initiating unit which includes a shunt trip circuit.

It is an object of the invention to provide a circuit breaker having an electronic fault sensing and trip initiating unit, including a magnetic delatch mechanism comprising a permanent magnet, a flux concentrator positioned adjacent thereto, a plunger type armature biased away from said permanent magnet but normally attracted thereto by the magnetic field of the permanent magnet, and a coil surrounding said plunger connected to said electronic fault sensing and trip initiating circuit, said coil providing a magnetic field when energized which is in opposition to the magnetic field of the permanent magnet thereby enabling the plunger to move away from the permanent magnet to cause the trip mechanism to trip and interrupt the circuit.

BRIEF DESCRIPTION OF THE DRAWINGS

FIG. 8 is a side elevation view of the cover shown in FIG. 6 with a fragmentary portion of the side wall broken away.

FIG. 9 is a side elevation view of the internal tripping mechanism, internal bus bar and thermal protective element of a circuit protective device in accordance with this invention.

FIG. 17 is a side elevation view of trip lever of a circuit protective device in accordance with this invention.

FIG. 18 is an end elevation view of the trip lever of FIG. 17.

FIG. 19 is a top plan view of the trip crossbar and its associated tripping and reset members extending therefrom.

FIG. 20 is a side elevation view of the trip crossbar and associated members shown in FIG. 19.

DESCRIPTION OF PREFERRED EMBODIMENT

Figure 1:
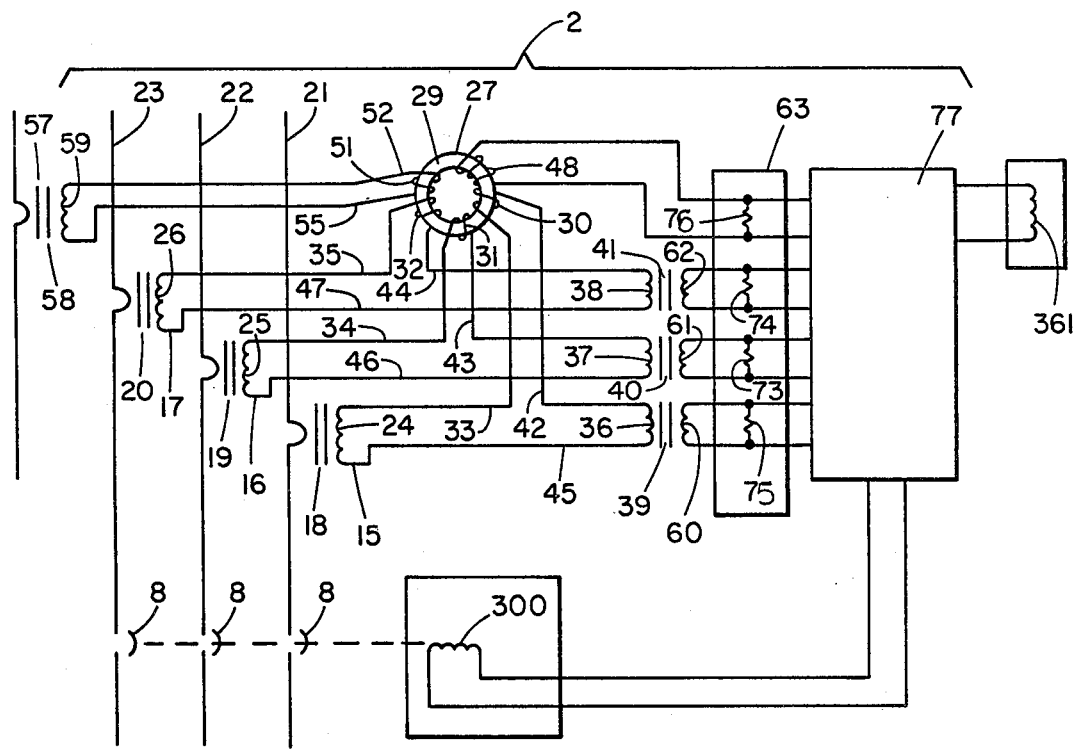
FIG. 1 is a diagrammatic view of the circuitry and component parts of a circuit protective device in accordance with this invention.

A multi-pole circuit breaker 1 includes an electronic fault sensing and trip initiating unit 2, a delatching assembly 3, an operating mechanism 4 which includes a tripping mechanism 5.

The operating and tripping mechanisms 4 and 5 are those of a circuit breaker known to the prior art, and are shown and described herein only to the extent necessary to fully describe the electronic fault sensing and trip initiating unit 2, the delatching assembly 3, and other parts of the invention disclosed herein.

Different types of operating and tripping mechanisms may be used with the electronic unit 2 and delatching assembly 3 of the invention.

The operating mechanism 4 is mounted in the circuit breaker case 6, comprising a base portion 6a and a cover portion 6b. The operating mechanism 4 includes an operating assembly 7 connected to move the movable contacts 8 of each pole between a contact open position and contact closed position with reference to the respective stationary contacts 9 of each pole. Movable contacts 8 are conductively connected respectively to corresponding terminals 10 of each pole at end 11 of the circuit breaker 1. Stationary contacts 9 are conductively connected respectively to corresponding terminals of each pole at the opposite end 12 of the circuit breaker 1.

The tripping mechanism 5 is movable by the operating assembly 7 to a latched position against the bias of toggle springs 14. When so latched, the movable contacts 8 may be moved by the operating assembly 7 to the contact closed position. Upon occurrence of a fault condition sufficient to actuate the magnetic delatching assembly 3, the tripping mechanism 5 is moved from its latched position whereupon the toggle springs 14 cause the breaker to trip thus rapidly moving the movable contacts 8 of each pole to the contact open position to interrupt the circuit.

The electronic fault sensing and trip initiating unit 2 includes three current transformers 15, 16 and 17, comprising transformer cores 18, 19 and 20 and in which internal bus bars 21, 22 and 23 of the breaker leading from terminals 10a, 10b and 10c are the respective primaries. A secondary winding 24 is provided for current transformers 15, secondary winding 25 for current transformer 16 and secondary winding 26 for current transformer 17.

A differential transformer 27 is mounted on a frame 28 secured to a support member 28a of the circuit breaker 1 over the center pole of the breaker adjacent the end 11. Differential transformer 27 includes a summing toroid 29, primary windings 30, 31 and 32 connected at first terminals thereof in series respectively with first terminals of secondary windings 24, 25 and 26 of respective current transformers 15, 16 and 17, by respective conductors 33, 34 and 35. The respective second terminals of primary windings 30, 31 and 32 are connected in series with first terminals of respective primary windings 36, 37 and 38 of step-up transformers 39, 40 and 41 by respective conductors 42, 43 and 44.

The respective second terminals of primary windings 36, 37 and 38 are connected to respective second terminals of the secondary windings 24, 25 and 26 of current transformers 15, 16 and 17, by respective conductors 45, 46 and 47.

The current transformers 15, 16 and 17 thus feed step-up transformers 39, 40 and 41 described more fully herein below. The current transformers also feed the primary windings 30, 31 and 32 of the differential transformer 27. Since current transformers 15, 16 and 17 are fed by the bus bars of each pole of the circuit breaker 1, in a three-wire grounded neutral A.C. distribution circuit one of them is inductively connected to the neutral conductor and the other two to the line conductors of the circuit. The primary of differential transformer 27 connected in series with the secondary of the neutral connected current transformer likewise carries the current induced from the neutral conductor while the other two carry the current induced from the two line conductors in such three-wire circuit. The result is that the sum of the currents flowing through the primaries 30, 31 and 32 of differential transformers 27 is normally opposite and equal, thus cancelling out to zero. The magnetic flux resulting from such current flow in the primaries 30, 31 and 32 is likewise normally opposite and equal, thus also cancelling out to zero.

The differential transformer 27 also includes a secondary winding 48, connected by conductors 49 and 50 to an electronic ground fault interrupting circuit as more fully described hereinbelow. While the sum of the currents and magnetic flux in the primaries 30, 31 and 32 are zero, there is no pick-up or voltage induced in secondary winding 48. However, if one of the line conductors becomes grounded on the load side, a portion of the current returns to source through a ground path rather than through the neutral conductor to which one of the current transformers 15, 16 or 17 and one of the primaries 30, 31 or 32 of the differential transformer 27 are inductively coupled. If the primary winding of differential transformer 27 which is coupled to the neutral conductor carries less current than the sum of the currents flowing in the line conductors, an imbalance of magnetic flux occurs which then induces a voltage signal in secondary winding 48. Such signal is transmitted by conductors 49 and 50 to means connected to the ground fault interrupting circuit, and if of sufficient magnitude it will trip the circuit breaker 1 and interrupt the circuit.

A fourth primary winding 51 is provided on the summing toroid 29 of differential transformer 27 for use in four wire circuits. This fourth primary winding 51 is connected at a first terminal to conductor 52 which leads to a first terminal screw 53 of a terminal block 54, and is connected at a second terminal to conductor 55 which leads to a second terminal screw 56 on terminal block 54. The terminal block 54 is mounted on the cover portion 6b of circuit breaker case 6, for convenient access from outside of the breaker. In a four wire circuit for which ground fault protection is desired, a separate current transformer 57 is mounted at any convenient location in the vicinity of the circuit breaker 1. The fourth bus bar or other conductor of the four wire system is series connected through the core 58 of the separate current transformer 57, such series connection through the core becoming the primary winding of such current transformer. A secondary winding 59 is provided on the core 58 of transformer 57, and the first and second terminals of such secondary 59 may then be connected respectively to first and second terminal screws 53 and 56 on terminal block 54. When such connection is made, currents flowing through the four wire system are fed to the summing toroid 29 of differential transformer 27 through its four primary windings 30, 31, 32 and 51. Such currents are normally equal and opposite, thus summing to zero and result in no net magnetic flux. If one of the line conductors of the four wire system becomes grounded on the load side, a portion of the current returns to source through a ground path, thus creating an imbalance in current between the primaries of differential transformer 27 resulting in a pick-up signal in its secondary winding 48 as described above for a three wire circuit.

The step-up transformers 39, 40 and 41 include secondary windings 60, 61 and 62 respectively. The secondary windings of the step-up transformers are connected to respective terminals on am ampere rating adjustment assembly 63 including receiving member 63a carried by cover portion or cover means 6b, by respective conductors 64 and 65 leading from the terminals of secondary winding 60, conductors 66 and 67 leading from the terminals of secondary winding 61, conductors 68 and 69 leading from the terminals of secondary winding 62.

The conductors 49 and 50 leading from secondary winding of differential transformer 27 also lead to respective terminals on the ampere rating adjustment assembly 63.

Thus, overcurrent faults sensed by current transformers 15, 16 and 17 are fed through step-up transformers 39, 40 and 41 to the ampere rating adjustment assembly 63, and ground faults sensed by differential transformer 27 are also fed to the ampere rating adjustment assembly 63.

The ampere rating adjustment assembly 63 includes a terminal connector 63b on cover means 6b connected to receiving member 63a and also connected to plug or card 63c in the base portion 6a of the circuit breaker case 6 having conductive strips connected to the respective terminals to which conductors 64, 65, 66, 67, 68 and 69 (from the step-up transformers) as well as conductors 49 and 50 (from the differential transformer) are connected. An ampere rating plug 70 having a stab portion 71 with conductive strips 72 for contact with corresponding conductive strips of the terminal slot in receiving member 63a selects the ampere rating when the stab 71 of ampere rating plug 70 is inserted therein. The ampere rating plug 70 includes four resistors 73, 74, 75 and 76 mounted therein and connected respectively to separate pairs of conductive strips 72, for connection to respective pairs of conductive strips in terminal slot of member 63a. When ampere rating plug 70 is inserted into the terminal slot of member 63a, respective ones of the resistors 73, 74, 75 and 76 are connected across respective conductor pairs 64–65, 66–67, 68–69 (leading from the secondaries of the step-up transformers 39, 40 and 41) and 49–50 (leading from the secondary of differential transformers 27). The value of the resistors 73, 74, 75 and 76 determines the ampere rating of the circuit breaker. The ampere rating of the breaker is therefore adjustable by providing a plurality of ampere rating plugs 70, each having mounted therein resistors of different selected values to enable varying the ampere rating of the breaker to chosen percentages of a base ampere rating. By way of example, the circuit breaker illustrated in the drawings and used as the basis of the description herein may have a base or nominal ampere rating of 2,000 amperes. A set of five ampere rating plugs, of which ampere rating plug 70 is an example, may be provided with resistors of different values to change the ampere rating of the breaker from 2,000 amperes to 1,000 amperes in increments of 200 amperes. That is to say, one rating plug would reduce the ampere rating 200 amperes, from 2,000 A. to 1,800 A. A second rating plug would contain resistors of such value that would reduce the ampere rating 400 amperes, from 2,000 A. to 1,600 A., and so on. It is of course possible and within the scope of this invention to choose different resistance values to conveniently provide different ampere ratings of a circuit breaker, other than those set forth above as examples.

A circuit board 77 is mounted in the cover portion 6b of the circuit breaker case 6. The circuit board 77 has mounted thereon the electronic solid state components which make up the overcurrent fault trip initiating circuits and the ground fault trip initiating circuits.

Conductor pairs lead to the circuit board 77 from the connections to the ampere rating adjustment assembly 63 as follows:

(a) Conductor pair 78 and 79 lead from the corresponding connections of conductor pair 64–65 (connecting secondary 60 of step-up transformer 39 to the ampere rating adjusting assembly), (b) Conductor pair 80 and 81 lead from the corresponding connections of conductor pair 66–67 (connecting secondary 61 of step-up transformer 40 to the ampere rating adjustment assembly), (c) Conductor pair 82 and 83 lead from the corresponding connections of conductor pair 68–69 (connecting secondary 62 of step-up transformer 40 to the ampere rating adjustment assembly), (d) Conductor pair 84 and 85 lead from the corresponding connections of conductor pair 49–50 (connecting secondary winding 48 of differential transformer 27 to the ampere rating adjustment assembly).

The overcurrent fault trip initiating circuits include an input section comprising a rectified power supply, a pick-up stage, a long time delay circuit, a short time delay circuit, an instantaneous trip circuit, and an electronic switching stage to initiate tripping of the circuit breaker.

The input section includes full wave rectification bridges 86, 87, 88 and 89. Conductors 78 and 79 provide a stepped up input voltage to bridge 86 from step-up transformer 39 which is inductively coupled to one phase of the circuit breaker. Conductors 80 and 81 provide a stepped up input voltage to bridge 87 from step-up transformer 40 which is inductively coupled to a second phase of the circuit breaker. Conductors 82 and 83 provide a stepped up input voltage to bridge 88 from step-up transformer 41 which is inductively coupled to a third phase of the circuit breaker. Conductors 84 and 85 provide a ground fault signal voltage to bridge 89 from differential transformer 27, in which all three phases (or four in a four wire system) of the circuit breaker serve as primary windings. The ground fault trip initiating circuit will be described in greater detail below.

When the circuit is operating normally under a no-fault condition, a pick-up alternating voltage will be induced in the respective current transformers 15, 16 and 17 which will be stepped-up by respective step-up transformers 39, 40 and 41, and fed to respective rectification bridges 86, 87 and 88. A rectified output is provided by bridges 86, 87 and 88 to produce a DC voltage across capacitor 90 through conductors 91 (leading from bridge 86), 92 (leading from bridge 87), 93 (leading from bridge 88), conductor 94 which leads from respective junctions with conductors 91, 92 and 93 to conductor 95 and thence to capacitor 90. The DC voltage produced across capacitor 90 is proportional to the AC voltage supplied by the step-up transformers 39, 40 and 41.

Figure 4:
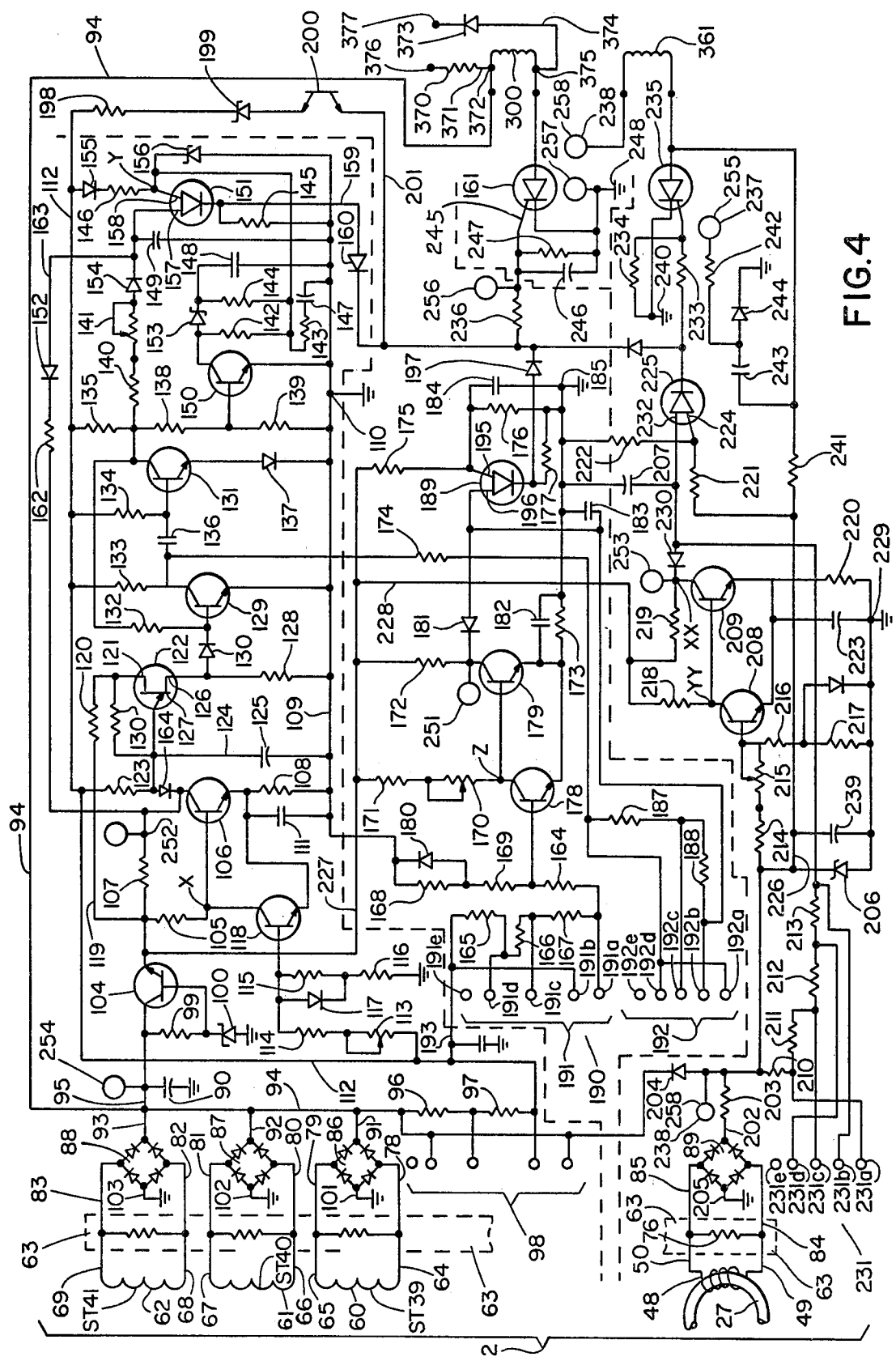
FIG. 4 is a schematic of the electronic circuitry of a circuit protective device in accordance with this invention.
Figure 24:
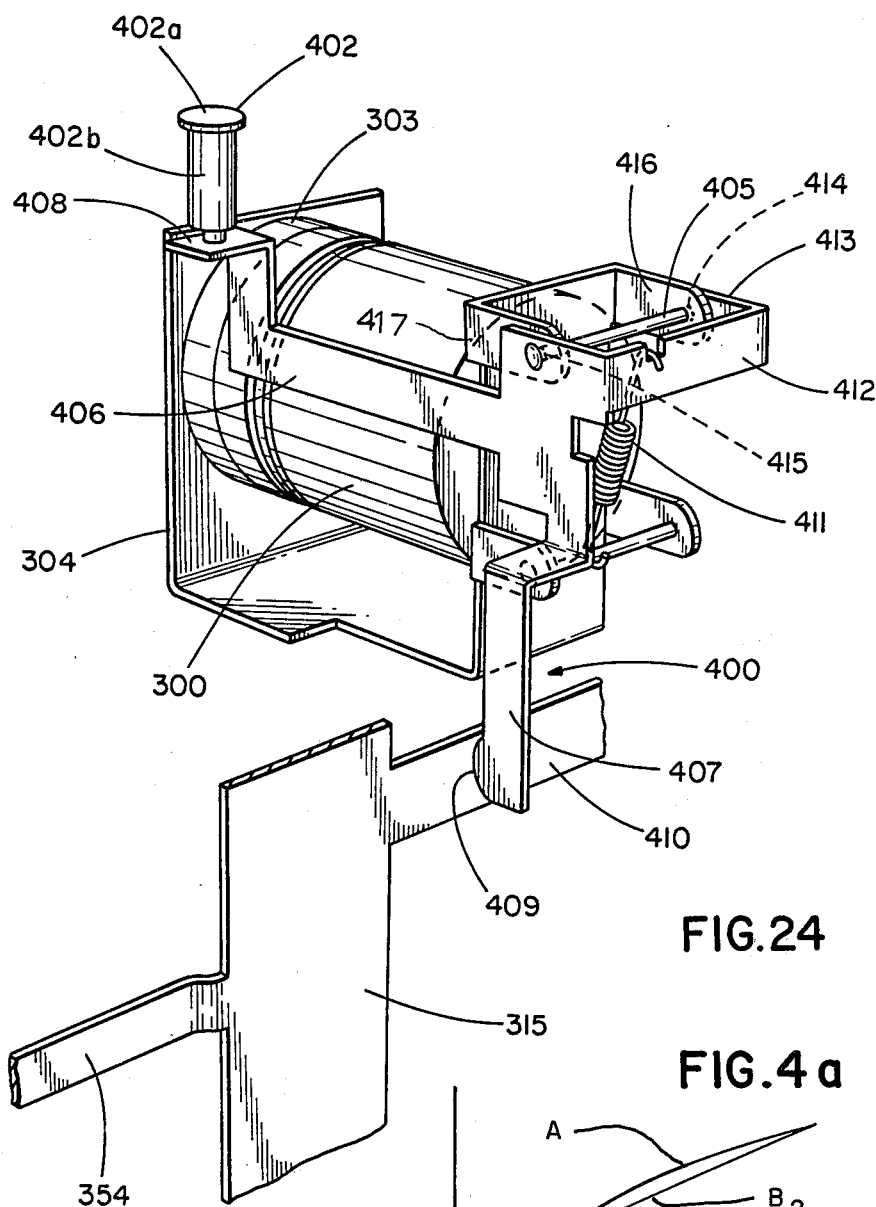
FIG. 24 is an isometric view of the safety trip mechanism of the circuit protective device in accordance with this invention, shown in position relative to the trip lever of which a fragment is shown.
Figure 5:
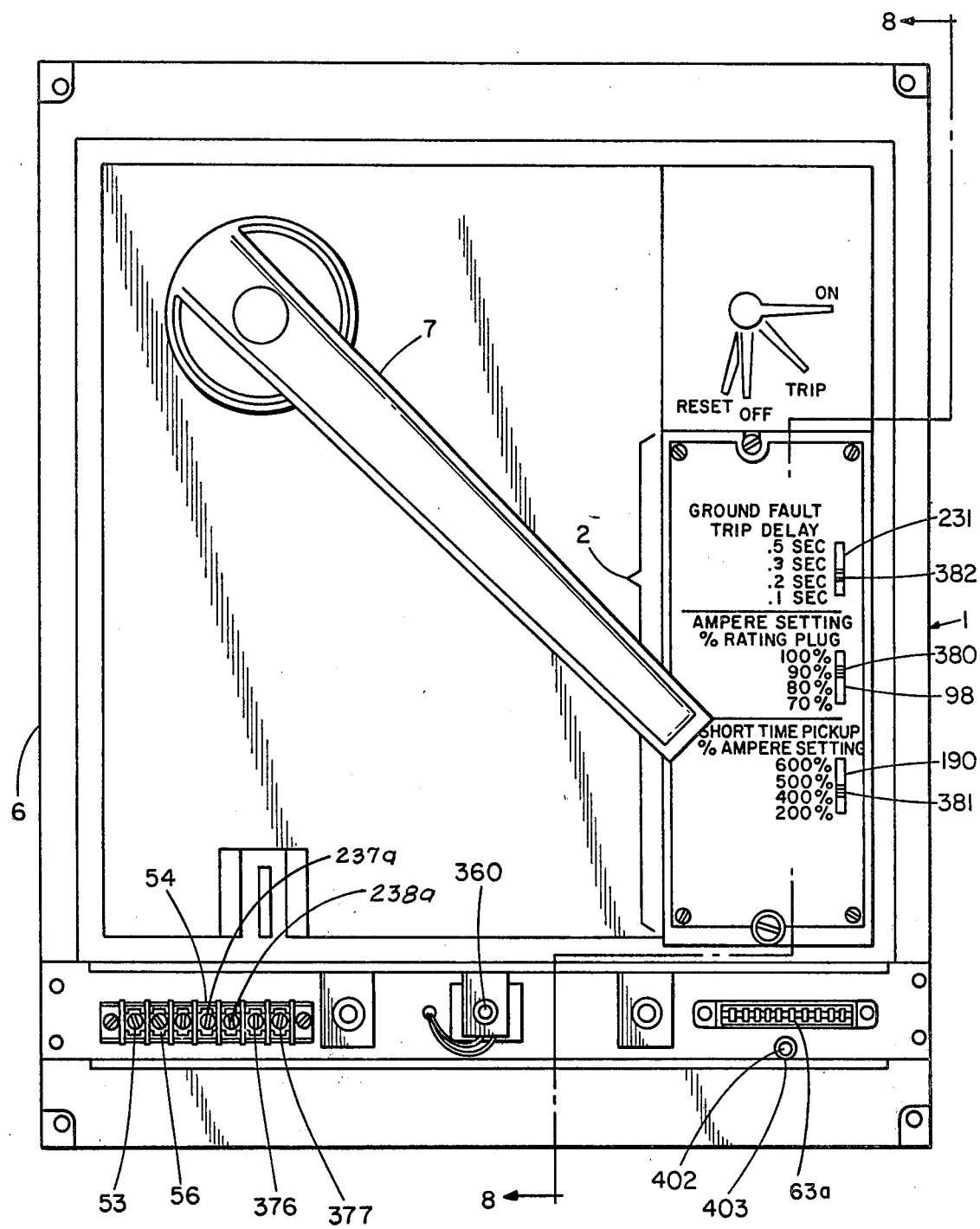
FIG. 5 is a front elevation view of a circuit protective device in accordance with this invention showing the externally mounted controls.
Figure 6:
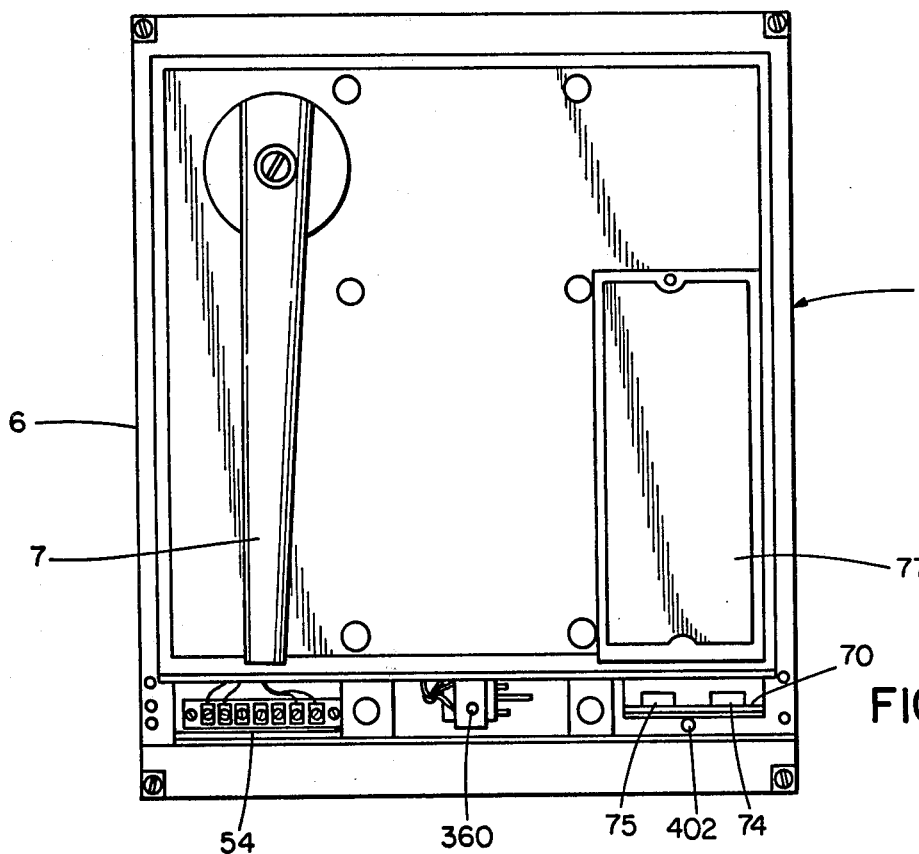
FIG. 6 is a front elevation view of the cover of a circuit protective device in accordance with this invention.
Figure 7:
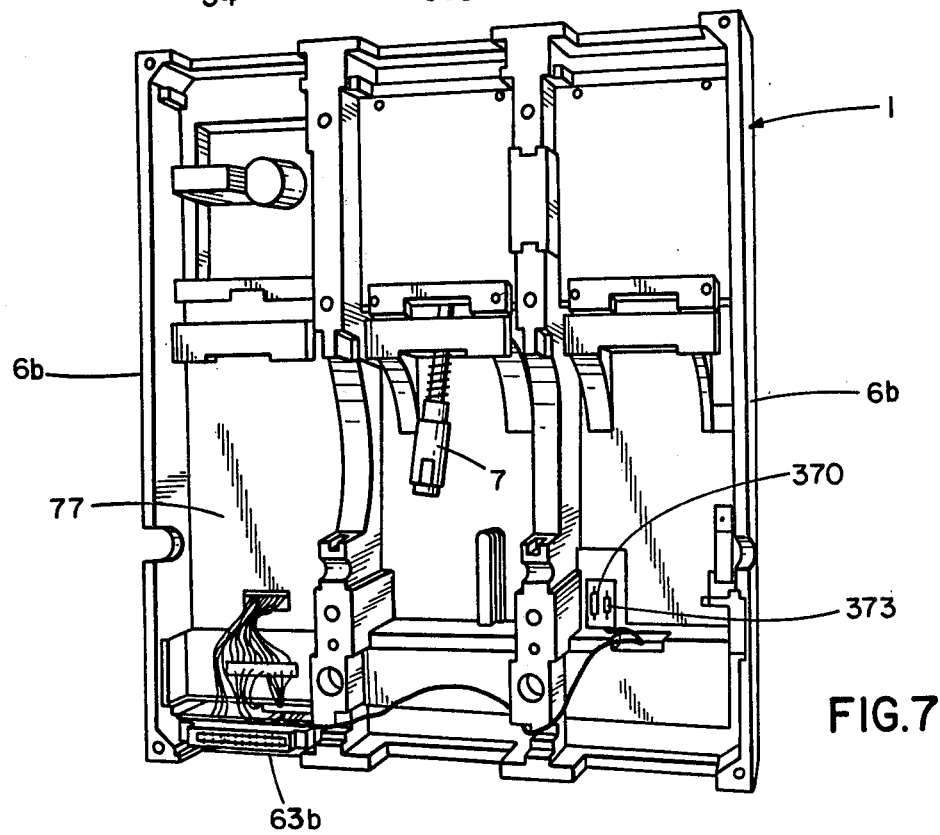
FIG. 7 is a perspective view of the rear side of the cover shown in FIG. 6.
Figure 10:
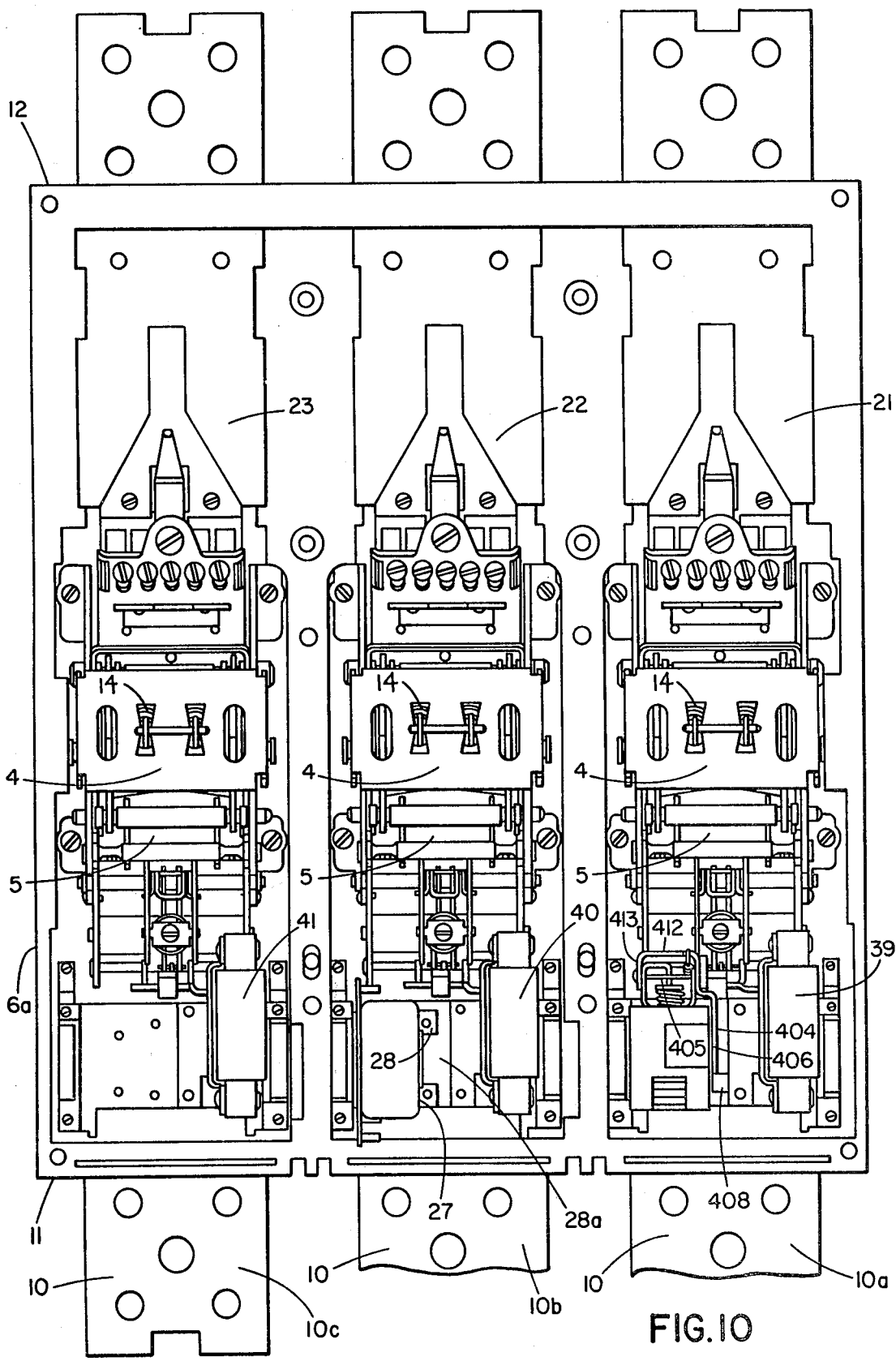
FIG. 10 is a front elevation view of a circuit protective device in accordance with this invention having the cover removed.
Figure 11:
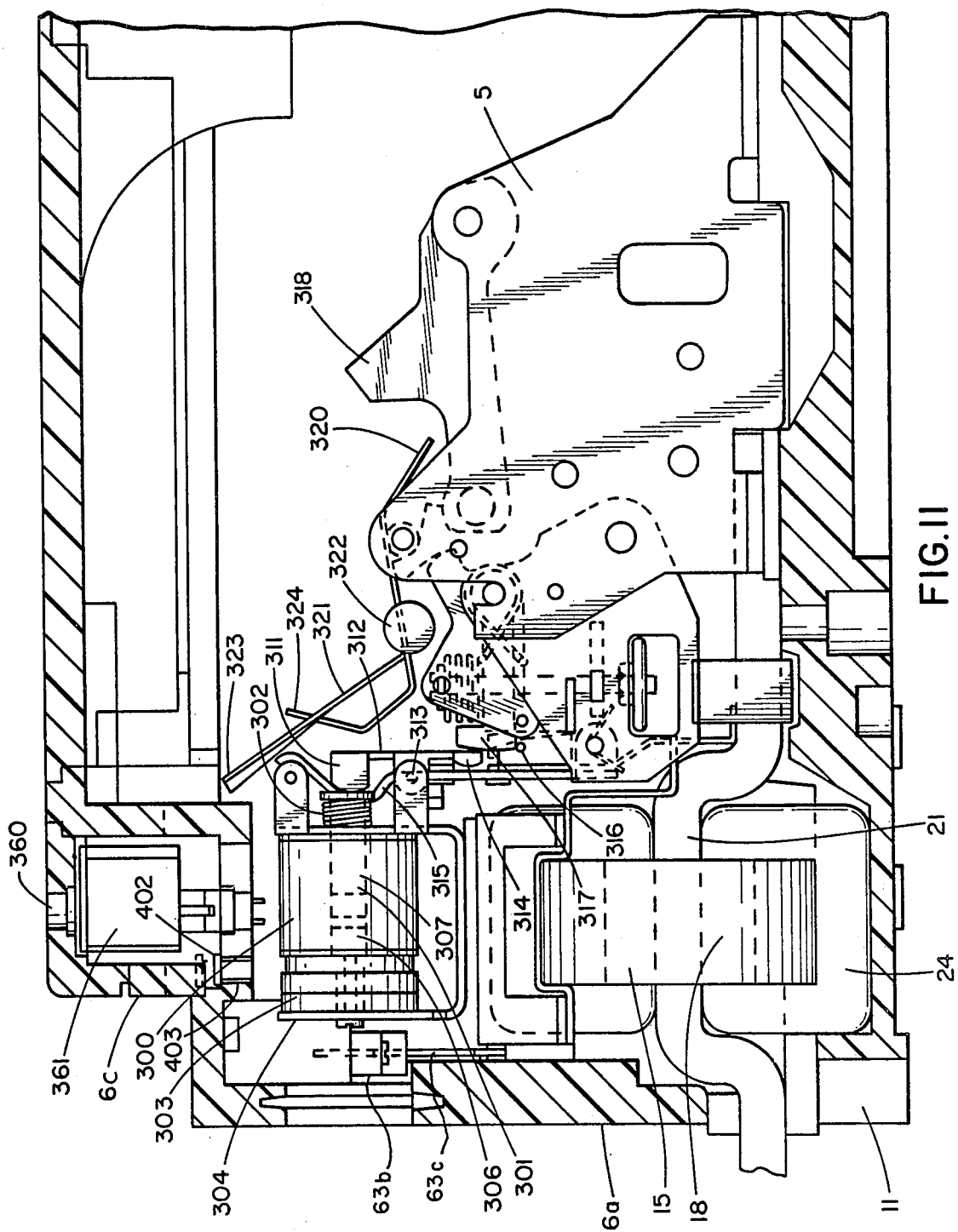
FIG. 11 is a fragmentary side elevation view of a circuit protective device in accordance with this invention, with the tripping mechanism shown in its latched position.
Figure 12:
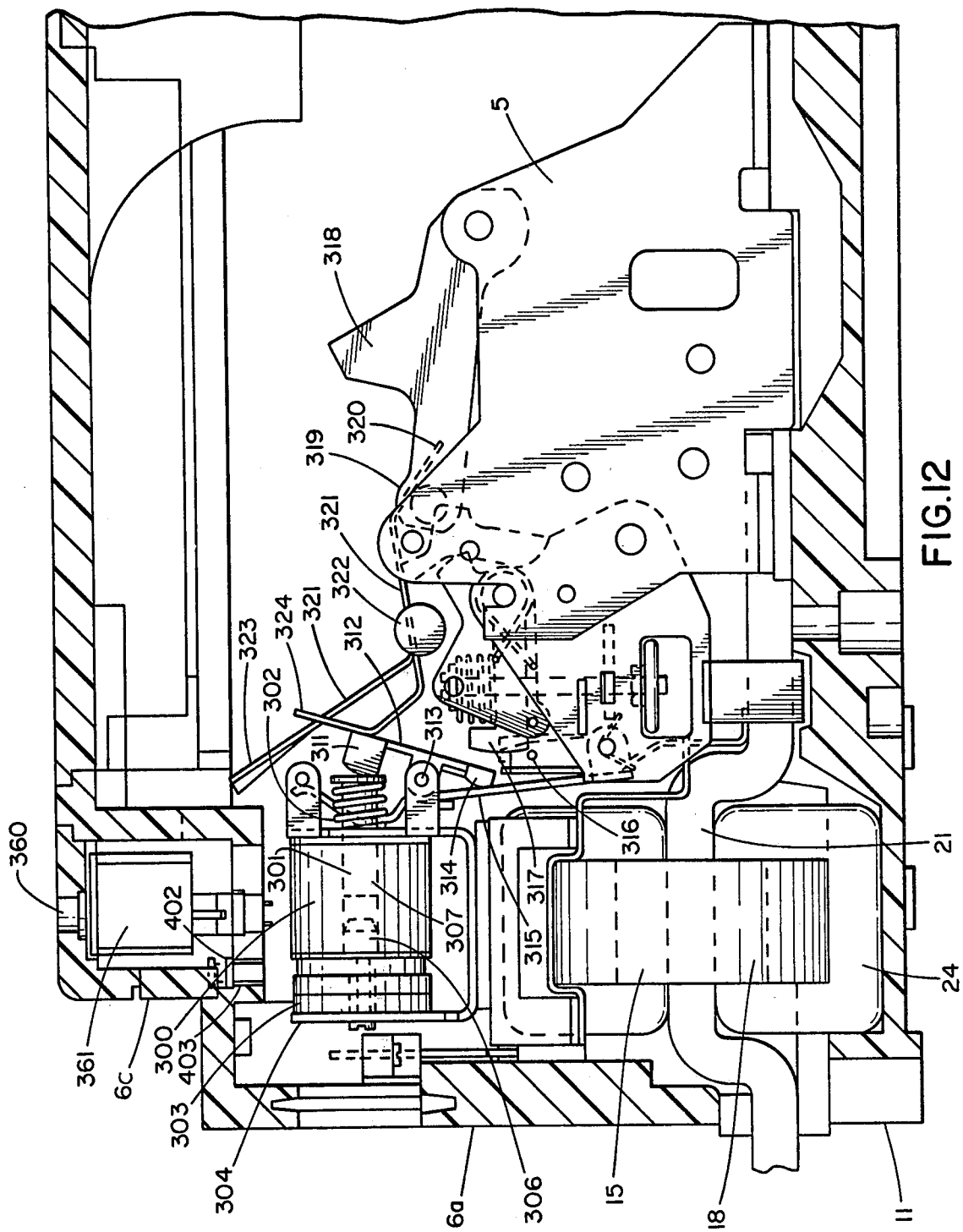
FIG. 12 is a fragmentary side elevation view of the circuit protective device in FIG. 11, with the plunger of the delatching mechanism shown in its delatching position and the tripping mechanism shown just prior to moving to the tripped position.

Resistors 96 and 97 are connected in series to conductor 94, and a four position ampere rating adjustment switch 98 is connected to conductor 94 at various settings in relation to resistors 96 and 97. The four position adjustment switch 98 operates by connecting the two poles adjacent whatever adjustment level the switch is set at. As shown in the drawings (FIGS. 4 & 5), when set at the 100% adjustment level, the two pins on each side of the designation 100% are connected which eliminates the switch entirely thus directing current through both of the associated resistors 96 and 97. When set at the 90% adjustment level, the two pins on each side of that designation are connected which shorts out resistor 96 so current is directed through resistor 97. Resistor 97 has a relatively higher resistance value than resistor 96, for example 4.7 Kohms for resistor 97 and 2.7 Kohms for resistor 96. When switch 98 is set at the 80% adjustment level, the two pins on each side of that designation are connected which shorts out resistor 97 (having relatively higher resistance) and directs current through resistor 96 (having relatively lower resistance). When switch 98 is set at the 70% adjustment level, the two pins on each side of that adjustment designation are connected which shorts out both resistors so the current completely bypasses the resistors 96 and 97. As will be apparent from this description, the higher the resistance inserted in the output circuit from rectifiers 86, 87 and 88, the higher the ampere rating of the circuit breaker.

At normal operating current and with no fault present, a low level output from the rectification bridges 86, 87 and 88 leads through conductors 94 and 95 to capacitor 90 charging it to a pre-determined voltage. When the ampere rating adjustment switch 98 is set at the 80% rating for example, the impressed voltage on capacitor 90 is about 12 volts.

The output signal is also directed through resistor 99 and zener diode 100 to circuit ground. A ground current path leads from the components which are circuit ground connected to the circuit ground connections of conductors 101, 102 and 103 leading to rectification bridges 86, 87 and 88 respectively, thus completing the electronic circuit of the DC power supply. The reverse breakdown voltage of zener diode 100 is at about 50% of the input voltage. The voltage drop across resistor 99 results in a lowering of the voltage on the emitter of the N-P-N transistor 104 to about 7 volts (as compared to about 12 volts on capacitor 90). Transistor 104 is conducting during normal current no fault operating conditions if the current is high enough and serves as a reference signal means developing a reference signal having a selected maximum value and providing power for the circuit with a current path through its emitter being directed through resistor 105 leading to the base of transistor 106 and resistor 107 leading to the collector of transistor 106, which is also conducting during normal current no fault conditions. The current path through the emitter of transistor 106 leads through resistor 108 and common conductor 109 to circuit ground through a ground terminal 110. The capacitor 111 which is in parallel with resistor 108 is charged to a small voltage to stabilize the circuit.

The other leg of the pick-up stage leads from resistors 96 and 97 and adjustment switch 98 through conductor 112 to a voltage divider network consisting of a variable resistor or potentiometer 113 and resistors 114, 115 and 116. A diode 117 is in parallel with resistor 115 to provide temperature compensation for the transistor 118, the base of which receives an output from the voltage divider network, but which is not conducting during normal current no fault conditions. Resistor 116 leads to circuit ground.

The voltage divider network just described serves in conjunction with the ampere rating adjustment switch 98 and its associated resistors 96 and 97 to set a reference voltage above which the transistor 118 begins to conduct, and below which it remains non-conductive. When an overcurrent fault condition occurs in one phase of the circuit and is picked up by the current and step-up transformers which monitor that phase, the DC voltage from the associated rectification bridge 86, 87 or 88 through the switch/resistor combination 96, 97 and 98 and through the voltage divider network (potentiometer 113, resistors 114, 115 and 116) rises above the reference voltage to render transistor 118 conductive and thus initiate activation of other components in the long time delay tripping circuit. The reference voltage is set at about 15 volts when the ampere rating adjustment switch 98 is set at 70%, at about 17 volts when set at 80%, at about 19.2 volts when set at 90%, and at about 21.3 volts when set at 100%.

The potentiometer 113 is inserted in the voltage divider network to adjust for any losses and enable fine tuning of the voltage divider to the desired pre-determined reference voltage.

Also while operating at normal current no fault condition, there is a current path from the junction between resistors 105 and 107 through conductor 119 and resistor 120 leading to a first base 121 of unijunction component 122. The resistor 120 limits current to unijunction component 122 and serves as a temperature compensator.

When an overcurrent fault condition occurs which is of sufficient magnitude to raise the reference voltage of the network supplying the base of transistor 118 above the pre-determined voltage levels, at such time the transistor 118 switches to a conductive state. Current is then drawn through its collector-emitter circuit, resulting in a lowering of the voltage at junction X, between resistor 105 and the base of previously conducting transistor 106. When the voltage on the base of transistor 106 is lowered, it switches to a non-conductive state. The current path through resistor 123 is then shunted through conductor 124 in which capacitor 125 is normally charged through resistor 123 to somewhat less than ½ of the voltage which appears at the first base 121 of unijunction component 122, that is during normal operating no fault conditions at which time unijunction 122 is not conducting through its second base 126. When the full rectified output is directed to capacitor 125 through resistor 123, it charges to above ½ of the voltage which appears at base 121 of unijunction transistor 122 causing unijunction 122 to change state and capacitor 125 to discharge. When it changes state, the unijunction begins to conduct through its second base 126, thus providing a current path from the emitter 127 of unijunction 122, through its second base 126, resistor 128, common conductor 109 and circuit ground terminal 110. This provides an input signal to the base of transistor 129 through diode 130 driving transistor 129 into saturation as described further hereinbelow. The unijunction transistor 122 then resets.

The components consisting of resistors 108, 120, 123, 128, and 130, capacitor 125, unijunction 122 and diode 130 comprise a relaxation oscillator circuit which delivers a series of oscillations or pulses to a pulse generator circuit at a pulse rate which is essentially linearly related to the input voltage of the fault condition being sensed. Thus, for a low magnitude fault condition the pulse rate is slower than for a high magnitude fault and in each case the pulse rate is proportional to the magnitude of the input voltage of the fault. The function of the diode 130 is to isolate the relaxation oscillator stage from the pulse generator stage.

The pulse generator circuit includes transistors 129 and 131, resistors 132, 133, 134 and 135, capacitor 136 and diode 137. Under normal operating no fault conditions, a low level output is supplied to transistor 131 through resistor 134 connected to the base of transistor 131 and through resistor 135 connected to its collector. Transistor 131 is biased into saturation through resistor 134. At such time, transistor 129 is non-conducting. Capacitor 136 is charged through resistor 133 to the input voltage of the circuit.

When a fault condition occurs of sufficient magnitude to generate a series of oscillations or pulses from the relaxation oscillator through unijunction transistor 122, base drive is provided to transistor 129 driving it into saturation on occurrence of each pulse. The charge on capacitor 136 through resistor 133 is nearly equal to positive input voltage, which under a fault condition of say 150% overcurrent would be about 25 volts positive on the side of capacitor 136 which is connected to resistor 133. The resulting voltage on the other end of capacitor 136 is driven to nearly negative input voltage. This negative potential applied to the base of normally conducting transistor 131 causes it to change state and become non-conducting. This causes the voltage on the collector of transistor 131 to rise to nearly input voltage, which constitutes the output of the pulse generator circuit.

While the collector voltage of transistor 131 is high, base drive is provided through resistor 132 to the base of transistor 129 which maintains transistor 129 in a saturated conducting state. During this interval of time, the capacitor 136 is being charged through resistor 134. When the charge on capacitor 136 reaches about one volt positive, the transistor 131 begins to conduct again which lowers the collector voltage resulting in less drive being applied to the base of transistor 129 causing it to abruptly change from a conducting to a non-conducting state. The capacitor 136 continues to charge, from nearly input voltage negative, to about 1.0 volt positive where the change in state of transistors 129 and 131 occurs, up to about input voltage positive. When transistor 129 changes to its original nonconducting state and transistor 131 to its original saturated or conducting state, the capacitor 136 then continues to charge through resistor 133 up to about the input voltage of the circuit. The cycle is repeated on receipt of the next oscillation or pulse from unijunction component 122 of the relaxation oscillator stage on the base of transistor 129.

It will be noted that capacitor 136 charges from input voltage negative to input voltage positive, and the change of state of transistors 129 (from saturated to non-conducting) and 131 (from non-conducting to saturated) occurs at about half way between these extremes.

The pulse width of the pulse generator output is therefore essentially independent of voltage, although the amplitude of the pulse output and the rate of the pulse output are linearly related to the input voltage of the fault condition being sensed.

The output pulses from the collector of transistor 131 in the pulse generating stage are fed to an integrating stage which consists of resistors 138 through 146, capacitors 147, 148 and 149, N-P-N transistor 150, programmable unijunction transistor 151, and diodes 152, 153, 154, 155 and 156. Such pulses from the collector of transistor 131 are applied to the capacitor 149 through resistor 140 and potentiometer 141. The diode 154 between resistor 141 and capacitor 149 serves as a low leakage component to prevent leakage discharge of the capacitor during that part of the cycle when the pulse is not present.

The charge on the capacitor 149 increases until it reaches a value which is determined by the voltage on the gate of the unijunction transistor 151. When the voltage charge on the capacitor 149 and on the anode 157 of unijunction 151 is about 0.6 volts greater than the voltage on the gate 158 of the unijunction transistor 151, the capacitor discharges into resistor 145 which is in turn applied through conductor 159 and diode 160 to the gate of the electronic switch, SCR (Silicon controlled rectifier) 161. The SCR 161 then turns on and energizes a tripping mechanism described in detail hereinbelow to trip the circuit breaker.

Figure 4A:
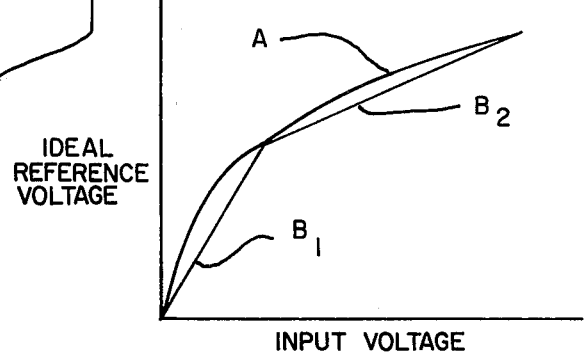
FIG. 4a is a graph illustrating the ideal reference voltage in comparison with the input voltage.

The voltage on the gate 158 of unijunction transistor 151 is a reference voltage determined by transistor 150, zener diode 153, resistor 142 and resistor 144. During the time that a pulse is being applied from the pulse generator, the transistor 150 is saturated receiving its base drive through resistor 138. During this time the pulse is being applied from the pulse generator, a reference voltage is applied to the gate 158 of unijunction transistor 151 through a voltage dividing network comprising resistors 142, 144, 146, N-P-N transistor 150, and zener diode 153. This reference voltage is dependent on the input voltage and compensates for non-linearity of the amplitude of charging voltage relative to the time it takes for the capacitor 149 to charge. Thus over a voltage range considerable error could result in charging capacitor 149 to a fixed reference voltage. For example, if the charging voltage is reduced by a factor of four the time delay is increased by more than a factor of four. In order to minimize this error the reference voltage supplied to the gate 158 of unijunction transistor 151 is made variable by the reference voltage network described herein, and it varies depending on the input voltage. The graph in FIG. 4a illustrates the ideal reference voltage against input voltage by curve A, and curve B (comprising two straight lines $B_1$ and $B_2$) illustrates the actual reference voltage generated by the reference voltage network described herein.

The variable reference voltage supplied to gate 158 of unijunction transistor 151 also serves to minimize leakage from the capacitor 149 through the unijunction transistor 151. If the voltage on the anode 157 of unijunction 151 increases by more than 0.6 volts above the voltage on the gate 158, the unijunction transistor 151 changes state from very high impedance (open circuit and non-conducting) to low impedance (closed circuit and conducting). Thus, as long as the reference voltage on the gate 158 is kept at more than 0.6 volts above the voltage on the capacitor 149 and the anode 157 of unijunction transistor 151, leakage of the charge on the capacitor will be minimized.

During the time capacitor 149 is being charged by receiving a pulse from the pulse generator stage through resistor 140 and potentiometer 141, there is of course no problem of leakage so the reference voltage or gate 158 of unijunction 151 may be established during application of the charging pulse at a predetermined level to permit unijunction 151 to change state from non-conducting to conducting when the magnitude and duration of the fault current being sensed reaches a pre-determined level. However, during the interval between pulses from the pulse generating stage leakage could occur from capacitor 149 through unijunction 151, so it is desirable to raise the reference voltage on gate 158 during such interval when capacitor 149 is not being charged, and lower it to the pre-determined level when capacitor 149 is being charged.

Such variation of the reference voltage level is accomplished as follows. When a pulse is being supplied to capacitor 149 from the collector of transistor 131 in the pulse generating stage, through resistor 140 and potentiometer 141, base drive is also being supplied to switching transistor 150 through resistor 138 driving it into saturation. A current path is then established from conductor 112, through resistor 146, resistor 144, zener diode 153, resistor 142, the collector emitter circuit of transistor 150 and circuit ground terminal 110. This current path through the voltage dividing network described results in establishing a voltage at junction Y at whatever pre-determined level desired for operation of the long time delay tripping circuit. Such reference voltage at junction Y is applied to the gate 158 of unijunction transistor 151 during the time that capacitor 149 is being charged by a pulse received from the pulse generator stage.

During the intervals between pulses, or when no pulses are being supplied by the pulse generator stage, there is no base drive to switching transistor 150 and it changes state to nonconducting. The voltage at junction Y and gate 158 of unijunction 151 is accordingly raised above the pre-determined reference level, and the gate voltage of unijunction 151 approaches the level of input voltage of the circuit limited by zener diode 156. The unijunction transistor 151 is thus maintained at a very high impedance state to minimize leakage during all times when no pulse is being received from the pulse generator stage and the capacitor 149 is not being charged.

When the magnitude and duration of the pulses from the pulse generating stage charge the capacitor 149 to more than about 0.6 volts above the reference voltage on gate 158 of unijunction transistor 151, the unijunction transistor changes state and conducts discharging capacitor 149 through resistor 145, conductor 159, diode 160, gating SCR 161 into conduction and delivering a tripping voltage to the tripping mechanism more fully described hereinbelow to trip the breaker and interrupt the circuit.

The long time delay tripping circuit described above produces a time delay which is inversely proportional to the square of the applied voltage. To produce such a time delay the gate voltage applied to unijunction transistor 151 must be a function of applied voltage, because as stated previously the time for a capacitor to charge to a given voltage is not a linear function of applied voltage. The reference voltage network described above provides such a variable reference voltage which varies as a function of applied voltage.

When an overcurrent fault occurs, the bus bars, circuit breaker, panelboard, and associated components become hot. It is therefore desirable to maintain a charge on capacitor 149 after an overcurrent fault clears and no further pulses are being received from the pulse generator stage. The charge on capacitor 149 should be allowed to slowly dissipate over a time period which corresponds with the time it takes for the bus bars and other components to cool. Thus, if another overcurrent fault occurs before they cool, a partial charge will remain on capacitor 149 which shortens the time delay period before it will initiate tripping of the breaker.

To accomplish this result, a diode 152 and a resistor 162 are connected in series through conductor 163 with capacitor 149. Thus when no further pulses are being received through resistors 140 and 141 from the pulse generating stage, a current path is provided by conductor 163 through which the charge on capacitor 149 can leak away at a controlled rate, the rate being pre-determined by the values selected for the diode 152 and resistor 162. The pre-determined leakage rate is chosen to correspond to the cooling rate of physical components of the circuit breaker and its associated electrical distribution system.

Since a charge is maintained on capacitor 149 for a predetermined time after a fault clears and an output is no longer received from the pulse generating stage, some means must be provided to keep the reference voltage on the gate 158 of unijunction transistor 151 at a level of 0.6 volts or more above the voltage charge on capacitor 149 which is also the voltage applied to the anode 157 of unijunction transistor 151. Otherwise, the unijunction would change state and initiate tripping even though the initial overcurrent fault condition had been cleared.

The reference voltage on gate 158 is maintained at such level of 0.6 volts or more above the voltage on capacitor 149 when the input voltage of the long time delay circuit drops below the retained voltage on capacitor 149 by capacitor 147 in conjunction with resistor 143 and diode 155. Capacitor 147 is charged through resistor 143 when the integrating stage is receiving an output from the pulse generating stage. The resistor 144 limits the rate of charging of capacitor 147 such that it does not interfere with the function of the reference voltage network described above. The charge on capacitor 147 is held by diode 155, which is series connected with capacitor 147 and positioned to block discharge thereof. Capacitor 147 is series connected to junction Y (connected to the terminal of gate 158 of unijunction 151), and diode 155 is cathode connected in series with junction Y. Thus, when a condition occurs whereby the input voltage to the long time delay circuit drops to a lower value than the retained charge on capacitor 149, such as when an overcurrent fault has cleared, there is a charge on capacitor 147 which is pre-determined (by selection of component values) at a level above that of the retained charge on capacitor 149. Such voltage appears at junction Y and gate 158 of unijunction 151 for at least as long as the time it takes for the charge on capacitor 149 to leak away through its leakage control circuit of resistor 162 and diode 152. The unijunction transistor 151 is thus prevented from changing state which would cause the breaker to trip during such time as a controlled leakage charge still remains on capacitor 149 and while no fault condition is being sensed by the long time delay circuit.

A short time delay trip initiating circuit is provided to sense overcurrent faults of high magnitude and initiate tripping of the breaker with less time delay than that provided by the long time delay circuit described above.

The short time delay circuit includes a pick-up stage and a voltage dependent time delay stage. Both the pick-up stage and time delay stage are adjustable by means of a resistor network and switch.

The pick-up circuit includes resistors 164, 165, 166, 167, 168, 169, 170, 171, 172, 173, 174, 175, and, transistors 178 and 179, diodes 180 and 181, capacitors 182, 183 and 184.

At voltage levels below the pre-determined pick-up voltage of the short time delay circuit, transistor 179 is conducting through resistor 172 series connected to its collector and through resistor 173 leading to ground terminal 185 connected in series to its emitter. The transistor 179 receives base drive through resistor 171 and variable resistor or potentiometer 170. The capacitor 183 which is connected across the emitter and collector circuit of transistor 179 is not able to charge above about 1.0 volt while this transistor is conducting. There is therefore no output from the pick-up stage at such voltage levels.

When a high overcurrent fault occurs above the pre-determined pick-up voltage, base drive to transistor 178 reaches the level which causes it to change state and begin to conduct through its collector emitter circuit. This results in a low voltage at junction Z, the base terminal connection of transistor 179, causing it to change state and become non-conducting. The collector voltage of transistor 179 then rises to approximately the regulated voltage level which will cause the relaxation oscillator stage of the short time delay circuit to begin operating, as explained more fully below. The diode 181 is provided between the resistor 172 and capacitor 183 to prevent charging the capacitor through this resistor 172 and to allow the capacitor 183 to discharge when transistor 179 becomes conductive. The capacitor 183 is charged from the input voltage through a resistance network in the relaxation oscillator stage as also explained more fully below.

The relaxation oscillator stage consists of resistors 187, 188, 174, 176 and 177, capacitors 183 and 90, and programmable unijunction 189. The capacitor 183 is charged from the input voltage which appears on conductor 112 leading from the ampere rating adjustment switch 98 (described above), through resistors 133 and 174 and then through the short time delay pick-up adjustment switch assembly 190 comprising a resistance network which sets both the pick-up level of the short time delay circuit and the time delay for each pick-up level.

Switch 190 is a four position slide switch which includes two sets of five pins each, the first set 191 controlling the pick-up level and the second set 192 controlling the maximum time delay setting for each pick-up level. The switch operator is movable to four positions, and in each position it connects the two adjacent pins of the first set 191 and the two adjacent pins of the second set 192. Thus, the pick-up levels may be set for an overcurrent fault of 200% at the setting designated 2X or 200%; 400% at the setting designated 4X or 400%; 500% at the setting designated 5X or 500%; and 600% overcurrent at the setting designated 6X or 600%.

At the 2X or 200% setting, pins 191a and 191b in the first set are connected and pins 192a and 192b in the second set are also connected by the switch operator. At this setting, all three resistors 165, 166 and 167 in series in conductor 193 and controlled by the first pin set 191 are shorted out; and resistors 187 and 188 controlled by the second pin set 192 are shorted out.

At the 4X or 400% setting, resistors 165 and 166 are shorted out, leaving resistor 167 in the circuit controlled by the first pin set 191; and resistor 188 is shorted out, leaving resistor 187 in the circuit controlled by the second pin set 192.

At the 5X or 500% setting, resistor 166 is shorted out, leaving resistors 165 and 167 in the circuit controlled by the first pin set 191; and resistor 187 shorted out, leaving resistor 188 in the circuit controlled by the second pin set 192.

At the 6X or 600% setting, all three resistors 165, 166 and 167 are in the circuit controlled by the first pin set 191; and both resistors 187 and 188 are in the circuit controlled by the second pin set 192.

For purposes of illustration and not by way of limitation, the resistors controlled by the first pin set 191 may have the following relative values:

Resistor 165—68 Kohms
Resistor 166—82 Kohms
Resistor 167—150 Kohms

The resistors controlled by the second pin set may have the following relative values:

Resistor 187—1.6 Meg. Ohms
Resistor 188—2.4 Meg. Ohms

Thus, at the 2X or 200% setting for pick-up at 200% overcurrent fault condition, there would be no resistance in the circuit from either pin set 191 or 192 of the short time delay pick-up adjustment switch assembly 190, although resistors 133 and 174 are in the circuit which passes through the second pin set 192 to charge capacitor 193 from the input voltage carried on conductor 112. The time delay established by the second pin set 192 at the 2X or 200% setting would be approximately 155 milli-seconds maximum for a fault condition of 200% overcurrent. The time delay decreases proportionately with the increase in percentage of overcurrent above the 200% level, or above whatever the setting may be.

At the 4X or 400% setting for pick-up at 400% overcurrent fault condition, there would be 150 Kohms resistance in the circuit controlled by the first pin set 191 to set the pick-up level at 400%; and there would be 1.6 Meg Ohms in the circuit controlled by the second pin set 192 to set the time delay at about 130 milliseconds.

At the 5X or 500% setting for pick-up at 500% overcurrent fault condition, there would be 68 Kohms plus 150 Kohms or a total of 218 Kohms in the circuit controlled by the first pin set 191 to set the pick-up level at 500%; and there could be 2.4 Meg Ohms in the circuit controlled by the second pin set 192 to set the time delay at about 124 milliseconds.

At the 6X or 600% setting for pick-up at 600% overcurrent fault condition, there would be 68 Kohms plus 82 Kohms plus 150 Kohms (i.e. resistors 165, 166 and 167) in the circuit controlled by the first pin set 191 to set a pick-up level at 600%; and there would be 1.6 Meg Ohms plus 2.4 Meg. Ohms (i.e. resistors 187 and 188) in the circuit controlled by the second pin set 192 to set the time delay at about 140 milliseconds. The time delay is inversely proportional to the level of overcurrent.

On occurrence of an overcurrent fault condition at or above the short time delay pick-up setting chosen, a voltage signal is transmitted on conductor 193 through the resistance network established by the first pin set 191 of the pick-up adjustment switch 190, and to the base of transistor 178 through resistor 164 driving it into saturation whereupon it begins to conduct causing transistor 179 to also change state as described above. Its collector voltage approaches the regulated voltage level established for the relaxation oscillator stage to begin operating.

The relaxation oscillator stage begins to operate when the voltage charge on capacitor 183 (received from input conductor 112 through resistors 133 and 174 and through the second pin set 192 of adjustment switch 190) builds up to 0.6 volts above the reference voltage supplied to the gate 195 of unijunction transistor 189. The reference voltage is supplied from the output of transistor 104 to charge capacitor 184 in the gate circuit of transistor 189. When the voltage on capacitor 183 reaches 0.6 volts thus making the anode 196 of unijunction 189 0.6 volts positive relative to its gate 195, the unijunction transistor 189 changes state and becomes conductive. Capacitor 183 then discharges through resistor 177, through diode 197, gating SCR 161 into conduction causing the breaker to trip.

An instantaneous trip initiating circuit is provided for very high overcurrent faults, consisting of a resistor 198 in series with a zener diode 199 and a trigger diode 200, connected to the input DC supply by conductor 112. When the input on conductor 112 reaches about 125 volts, the reverse breakdown point of zener diode 199 is reached allowing current to pass to trigger diode 200 which in turn passes current through conductor 201 to trigger SCR 161 into conduction to trip the circuit breaker without any time delay.

A ground fault trip initiating circuit is also provided for protection of the breaker and distribution system against ground faults of a magnitude which would not be sensed and picked up by the other trip initiating circuits. The ground fault trip circuit includes a pick-up stage and a time delay stage.

Ground faults are sensed by the differential transformer 27 and are fed to the rectification bridge 89 from the secondary winding 48 through conductors 49 and 50 to the ampere rating adjustment plug 63, and through conductors 84 and 85 to bridge 89. A DC rectified power supply is fed to the ground fault trip initiating circuit through conductor 202 and resistor 203 on occurrence of a ground fault sensed by differential transformer 27 and picked up in its secondary winding 48.

A ground fault would be sensed by differential transformer 27 when one of the phases of the distribution circuit becomes grounded on the load side of the breaker, whereupon a portion of the current would return to source through a ground path rather than through the neutral conductor of the system. The currents, and magnetic flux, at differential transformer 27 would thus be imbalanced, resulting in net magnetic flux to be picked up in the secondary winding 48.

The rectified ground fault output from bridge 89 is carried to storage capacitor 90 through resistor 203, diode 204, the pick-up adjustment switch 98, and conductors 94 and 95. Capacitor 90 leads to circuit ground, and ground terminal connection 205 of bridge 89 completes the ground circuit.

The resistor 203 in combination with zener diode 206 limits the voltage from the ground fault which is applied to storage capacitor 90 and to the ground fault pick-up and delay circuits. This is done to prevent the short time delay trip initiating circuit from responding to the voltage that would appear on storage capacitor 90 if the voltage were not limited, and to allow a substantially constant charging voltage to be applied to the time delay capacitor 207.

The pick up stage of the ground fault trip initiating circuit includes transistors 208 and 209, resistors 203, 210 through 222, capacitors 223 and 207. Resistor 215 is a variable resistor. The pick-up voltage level on the ground fault trip initiating circuit is determined by the voltage dividing network consisting of resistor 214, variable resistor 215, resistors 216 and 217, and such voltage is applied to the gate 224 of the unijunction transistor 225 through conductor 226 and resistor 221. The pick-up voltage level on the ground fault trip initiating circuit is adjustable internally at the factory by changing the setting of variable resistor 215, but it is not externally adjustable by the user.

Operation of the ground fault trip initiating circuit is as follows. Below the pick-up voltage level, transistor 209 is conducting and transistor 208 is non-conducting. When transistor 209 is conducting to maintain capacitor 207 discharged, a current path extends from the DC power supply input through conductors 94 and 95, transistor 104, conductors 227 and 228, through resistor 218 to the base of transistor 209, through resistor 219 to the collector of transistor 209, through resistor 220 and then to circuit ground terminal 229.

Transistor 208 is non-conducting at conditions below the pick-up voltage level of the ground fault trip initiating circuit.

While transistor 209 is conducting, a low voltage of about 1.0 to 1.5 volts is present at its collector and at the junction XX between the collector of transistor 209 and the cathode of the diode 230 which is anode connected to the time delay capacitor 207. Thus, while such low voltage is present at junction XX, capacitor 207 cannot be charged to more than approximately 1.0 to 1.5 L volts since current flowing through the resistor network 210, 211, 212 and 213 to the junction between capacitor 207 and the anode side of diode 230 will find a low voltage path through diode 230 to junction XX.

When a ground fault voltage signal appears at the output of bridge 89 which exceeds the set pick-up level established by the voltage divider network of resistors 214, 215, 216 and 217, transistor 208 and 209 change state. Transistor 208 begins to receive base drive through resistors 214 and 215, whereupon current flows from resistor 218 through its collector to emitter circuit, through resistor 220 and circuit ground terminal 229. A low voltage results at junction YY between the collector of transistor 208 and resistor 218, causing transistor 209 to change state and become non-conducting. At such time, the collector voltage of transistor 209 rises from about 1.0 or 1.5 volts to about 7 volts, which likewise raises the voltage at junction XX to about 7 volts. The capacitor 207 can then be charged through resistors 210, 211, 212 and 213, or selected ones depending on the delay setting of ground fault time delay adjustment switch 231, since the high voltage at junction XX blocks the previous path through diode 230.

The ground fault time delay adjustment switch 231 is a four position slide switch to adjust the response time of the tripping mechanism on occurrence of a ground fault. At a setting of 0.1 as shown on the drawing the time delay may be for example 100 milliseconds; at a setting of 0.2 it may be for example 200 milliseconds; at a setting of 0.3 it may be for example 300 milliseconds; and at a setting of 0.5 it may be for example 500 milliseconds.

The switch circuit includes resistors 211, 212 and 213, which can be shorted out and inserted into the capacitor charging circuit in various combinations depending on the switch setting. The resistors have varying relative values; for example, resistor 211 may be 680 Kohms, resistor 212 may be 1.5 Megohms,, and resistor 213 may be 620 Kohms.

When the operator of switch 231 is set at the 0.1 position, pins 231a and 231b are connected, which shorts out resistors 211, 212 and 213 leaving no resistance in the switch circuit itself for a time delay of 100 milliseconds in the example given. When set at the 0.2 position, pins 231b and 231c are connected, which shorts out resistors 212 and 213 leaving resistor 211 in the switch circuit to provide a switch circuit resistance of 680 Kohms in the example given for a time delay of 200 milliseconds. When set at the 0.3 position pins 231c and 231d are connected, which shorts out resistor 212 leaving resistors 211 and 213 in the switch circuit to provide switch circuit resistance of 680 Kohms plus 620 Kohms for a total of 1.3 Megohms which provides a time delay of 300 milliseconds in the example given. When set at the 0.5 position, pins 231d and 231e are connected, which inserts all three resistors 211, 212 and 213 in the circuit to provide switch circuit resistance of 2.8 Megohms for a time delay of 500 milliseconds in the illustrative circuit shown and described herein. These values may of course be varied without departing from the scope of the invention.

Resistor 210 is in the capacitor charging circuit in addition to any or all of the resistors 211, 212 and 213 which make up the switch resistor circuit, as is resistor 203.

Capacitor 207 is connected to the anode 232 of unijunction transistor 225. When the voltage charge on capacitor 207 (and thus on the anode 232 of unijunction 225) reaches the level at which it is about 0.6 volts above the voltage on the gate 224 of unijunction 225, the unijunction transistor changes state from very high impedance (resembling an open circuit) to low impedance. Capacitor 207 then discharges into resistors 233 and 234 to gate an electronic switch comprising an SCR 235 into conduction, and also discharges into resistor 236 to gate SCR 161 into conduction which initiates tripping of the breaker.

The SCR 235 is connected to a solenoid described later herein which actuates visual indication means to indicate that the breaker tripped due to a ground fault condition.

Internal ground fault trip indication terminals 237 and 238 are connected to terminals 237a and 238a on terminal block 54. A separate electronic monitoring assembly having an indicator lamp, of the type described in U.S. Pat. No. 3,943,409 assigned to the assignee of the present application, can be connected to terminals 237a and 238a for external or remote indication of tripping due to a ground fault condition.

The ground fault indicator solenoid is energized by the discharge of capacitor 239 through terminal 238 switched by SCR 235. The capacitor 239 is charged from the ground fault differential transformer 27 through bridge 89 and resistor 203 upon occurrence of a ground fault. After the appropriate delay, electronic switch SCR 161 is triggered by a pulse from the discharge of capacitor 207. This same pulse also triggers SCR 235 into conduction and allows capacitor 239 to discharge through the ground fault trip indicator solenoid, SCR 235, and circuit ground terminal 240.

The externally mounted electronic monitoring assembly having an indicator lamp to indicate a trip due to a ground fault condition requires a pulse of a certain magnitude and duration, such as 32 volts with a duration of at least one millisecond. This is provided by combining the signal appearing on internal terminal 238 with a pulse which appears on internal terminal 237. The pulse at terminal 237 is provided by the circuit consisting of resistors 241 and 242, capacitor 243 and diode 244. The capacitor 243 is charged through about 24 volts for example upon the occurrence of a ground fault, the charging voltage selected depending on the relative values of the other components in the circuit. After the appropriate delay (dependent on the setting of time delay switch 231 and the magnitude of the ground fault) the ground fault trip occurs and SCR 235 is triggered into conduction forcing the positive side of capacitor 243 to ground. Since the capacitor discharge path is blocked by diode 244, the output to terminal 237 will be approximately −24 volts in the example given for purposes of illustration. The voltage on terminal 238 charged by capacitor 239 in the embodiment described herein is +24 volts, so the potential difference between terminals 237 and 238 is +48 volts, which is the output available for the externally mounted electronic monitoring assembly having a ground fault trip indicating lamp.

The electronic switch 161 is triggered into conduction by voltage signals transmitted from either the long time delay trip circuit, the short time delay trip circuit, the instantaneous trip circuit or the ground fault trip circuit to the gate 245 of SCR 161. A capacitor 246 and resistor 247 are provided in parallel with the cathode—gate circuit of SCR 161 for the purpose of suppressing transients and noise which might otherwise trigger the SCR 161 into conduction.

The tripping energy is supplied to the tripping coil controlled by SCR 161 by storage capacitor 90 discharging through conductor 94, energizing the tripping coil and through SCR 161 to circuit ground through circuit ground terminal 248.

The circuit breaker in accordance with this invention includes means for a user to test the various trip initiating circuits when desired to determine that the circuits are in proper operating condition. Such means includes test terminals 251 through 258. One series of tests will enable the user to conveniently test the pick-up levels of the long time delay trip initiating circuit, the short time delay trip initiating circuit and the ground fault trip initiating circuit. A second series of tests will enable the user to conveniently test the time delay section of the circuitry.

An appropriate testing device may be connected to a conventional 120 AC power supply, and will provide a DC output of from 0 to 150 volts. It includes a terminal insert corresponding to the ampere rating adjustment plug 70, which is inserted into the receiving member 63a in the cover 6b of the circuit breaker being tested. The ampere rating adjustment plug 70 is removed from the breaker and inserted into a corresponding terminal slot in the testing device, so the same ampere rating of the breaker is applied to the testing device. The testing device includes a pair of output conductors having connecting terminals for connection to corresponding terminals at appropriate test points in the electronic circuits to be tested for the purpose of applying an appropriate test voltage to the circuits being tested. Additional leads and terminal connections are provided to short out the circuits not being tested, and to measure the response at selected test points in the circuit which is being tested. The testing device as such is not a part of the present application, and any test device capable of providing a DC voltage of between 0 volts to 150 volts DC to a circuit, and measuring the response voltage at selected test points of the circuit being tested, could be made to operate for purposes of testing the circuits. The test portion of the circuitry which is included as part of the invention covered by the present application is that which is physically incorporated in the circuitry of the circuit breaker itself.

The short time delay trip initiating circuit includes a test point terminal 251 connected between the collector of transistor 179, resistor 172 and diode 181.

The long time delay trip initiating circuit includes a test point terminal 252 connected between the collector of transistor 106, resistor 107 and diode 164.

The ground fault trip initiating circuit includes a test point terminal 253 connected between the collector of transistor 209, resistor 219 and diode 230.

A voltage input test terminal 254 is connected to storage capacitor 90 to provide test voltages to the short time delay and long time delay circuits respectively as they are being tested.

A short-to-ground test terminal 256 is provided, connected between the gate 245 of electronic switch SCR 161 and the output conductors of the various trip initiating circuits, to short the electronic switch out to ground and prevent actual tripping of the circuit breaker during the short time delay test. The time between sensing such faults and tripping is so short (e.g. less than one second), so it is desirable for measuring response during a test of the short time delay circuit to avoid actual tripping of the breaker.

A circuit ground test terminal 257 is provided for connection to ground terminal 248 of the circuit. A ground terminal lead from the testing device is connected to test terminal 257 to complete the circuit which begins at input test terminal 254 which receives an input test voltage through a lead from the testing device, or at a second input test terminal 258 described in the next paragraph.

A second voltage input test terminal 258 is provided to supply an appropriate test voltage to the ground fault trip initiating circuit. Test terminal 258 is connected to the ground fault trip initiating circuit between resistor 203, diode 204, and the ground fault indicator solenoid. Test terminal 258 is also connected to terminal 238 which receives the discharge from capacitor 239 as it is applied to the ground fault indicator solenoid on occurrence of a ground fault of tripping magnitude and duration. During a simulated ground fault for test purposes, the testing device supplies the simulated ground fault voltage to terminal 258 which the rectification bridge 89 normally supplies to terminal 238 on occurrence of an actual ground fault condition in the distribution circuit protected by the circuit breaker of this invention.

The testing means in accordance with this invention operates as follows. After connecting the terminal insert of the testing device in terminal receiving member 63b of the circuit breaker, and the ampere rating adjustment plug 70 in a corresponding terminal slot of the testing device, the voltage output lead of the testing device is connected to terminal 254 of the circuit breaker and the ground terminal lead of the testing device is connected to terminal 257 of the circuit breaker.

To test the pick-up stages of the long time delay and short time delay circuits, the lead from the testing device which measures response from the circuit being tested is connected either to test terminal 251 (short time delay circuit) or test terminal 252 (long time delay circuit) depending on which circuit is being tested, and short-out leads are also connected to the test terminals of the pick-up stages of the other two circuits which are not at the time being tested. Thus, if the pick-up stage of the short time delay circuit is being tested, test terminal 252 in the long time delay circuit and test terminal 253 in the ground fault circuit would be shorted out by connecting the short-out leads thereto.

When the pick-up stage of the long time delay circuit is being tested, test terminal 251 in the short time delay circuit and test terminal 253 in the ground fault circuit could be shorted out by connection thereto of the short-out leads.

When the pick-up stage of the ground fault circuit is being tested, test terminal 251 in the short time delay circuit and test terminal 252 in the long time delay circuit are shorted out by connecting the short-out leads to such terminals.

The first test may be of the pick-up stage of the long time delay circuit. A simulated overcurrent voltage of about 15 volts or above is applied to test terminal 254, whereupon a transition from low voltage (e.g. 1.5 volts) to high voltage (e.g. 7 volts) should appear at test terminal 252 if the pick-up stage of the long time delay circuit is operating properly.

The next test may be of the pick-up stage of the short time delay circuit. A simulated overcurrent voltage of about 26 volts or above is applied to test terminal 254, whereupon a transition from low voltage (e.g. 1.5 volts) to high voltage (e.g. 7 volts) should appear at test terminal 251 if the pick-up stage of the short time delay circuit is operating properly.

The third test may be of the pick-up stage of the ground fault time delay circuit. A simulated ground fault voltage of about 18 volts is applied to test terminal 258, whereupon a transition from low voltage (e.g. 1.5 volts) to high voltage (e.g. 7 volts) should appear at test terminal 253 if the pick-up stage of the ground fault stage is operating properly.

The voltage levels applied to the input test terminals to simulate an overcurrent fault of sufficient magnitude to activate each circuit will depend on the setting of the ampere rating adjustment switch 98. In the examples of voltages given above for purposes of illustration, switch 98 may be at the 70% setting.

The fourth test may be of the time delay stage of the long time delay circuit. With test terminals 251 (in the short time delay circuit) and 253 (in the ground fault circuit) shorted out as described above, an input voltage is applied from the testing device to test terminal 254 at selected voltages above the trip level of about 15 volts (at a 70% setting of ampere rating adjustment switch 98). At 15 volts, a time delay of about 500 seconds for example may occur before tripping occurs (or before a gating signal is applied to SCR 161) if the time delay section of the long time delay circuit is working properly. When a higher voltage such as 30 volts is applied to test terminal 254, the time delay should be reduced to about 250 seconds, i.e. inversely proportional to the increase in voltage applied, if the circuit is working properly.

The fifth test may be of the time delay stage of the short time delay circuit. With test terminals 252 (long time delay circuit) and 253 (ground fault circuit) shorted out, an input test voltage of about 40 volts may be applied to test terminal 251. If the short time delay stage is operating properly, the breaker will trip within less than one second. The test terminal 256 may be shorted to ground to prevent triggering of SCR 161 and actual tripping of the breaker. The elapsed time may then be measured between application of the voltage on test terminal 251 and appearance of a triggering signal on test terminal 256. If the elapsed time is greater than instantaneous, and less than about one second, when a test voltage is applied of a magnitude which simulates that of an overcurrent fault which would initiate operation of the short time delay circuit, the time delay stage of this circuit is functioning properly. The elapsed time will vary depending on the setting of short time delay adjustment switch 190.

The sixth test may be of the time delay stage of the ground fault circuit. With test terminals 251 (short time delay) and 252 (long time delay) shorted out, an input test voltage of about 30 volts for example may be applied to test terminal 258. If the ground fault time delay stage is operating properly, the elapsed time between application of the test voltage and appearance of a tripping signal on test terminal 256 (or actual tripping of the breaker) should be greater than an instantaneous trip and less than about one second. The elapsed time will of course vary depending on the setting of the ground fault time delay switch 231.

When a trip initiating signal is received at the gate of electronic switch SCR 161, it is triggered into conduction allowing capacitor 90 to discharge into a trip coil 300 of the magnetic delatching assembly 3. The delatching assembly 3 includes a plunger type armature 301 slidingly positioned in trip coil 300, normally biased outwardly to the unlatching position by helical compression spring 302. A permanent magnet 303, mounted on ferrous magnet frame 304, in conjunction with a soft iron flux concentrator 305, holds armature 301 inwardly of trip coil 300 to the latching position. When the gap between the end 306 of the flux concentrator 305 and the shank 307 of armature 301 is closed, the magnetic field of the permanent magnet 303, enhanced by flux concentrator 305, has sufficient force to hold the armature 301 inwardly against the bias of spring 302. The magnetic flux of the permanent magnet 303 flows in a direction from the north pole 308 of the permanent magnet 303, through the magnet frame 304, through the shank 307 of armature 301, through the flux concentrator 305 and to the south pole 309 of the permanent magnet 303. A non-magnetic screw 310 holds the permanent magnet 303 and flux concentrator 305 in place on the magnet frame 304.

Figures 2, 3:
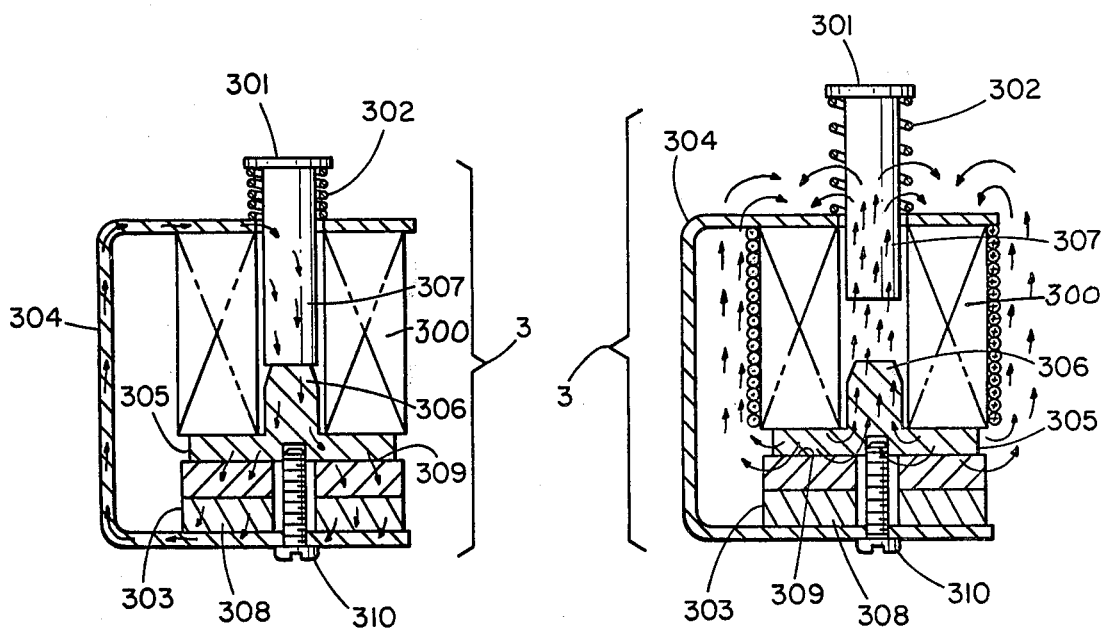
FIG. 2 is an elevation view of the magnetic delatching assembly, partly in section, of a circuit protective device in accordance with this invention with the plunger shown in the reset or latched position.
FIG. 3 is an elevation view of the magnetic delatching assembly of FIG. 2 with the plunger shown in the trip or unlatching position.

When a trip initiating signal gates SCR 161 into conduction, the current flow through coil 300 is such that the magnetic field generated by such current flow opposes that of the permanent magnet, thus weakening its magnetic attraction force sufficiently to enable the bias of spring 302 to overcome such attracting force thus moving armature 301 outwardly to its unlatching position. As shown in the drawing (FIG. 3), the current in coil 300 may be considered as flowing towards the viewer on the left-hand side of the figure and away from the viewer on the right-hand side. Thus, in accordance with the right-hand rule for determining direction of magnetic flux in an electromagnet, the flux path through the core of the coil 300 may be considered to be from the end adjacent the permanent magnet 303 to the end adjacent the helical compression spring 302.

Since the direction of magnetic flux of the energized coil is opposite the direction of magnetic flux of the permanent magnet, the respective magnetic fields diminish in strength enabling spring 302 to move armature 301 outwardly to contact first end portion 311 of rocker arm 312. Rocker arm 312 then pivots on pivot pin 313 causing its second end portion 314 to strike trip lever 315. Trip lever 315 then moves rearwardly drawing latch pin 316 from latch member 317, causing the circuit breaker to trip.

Figure 13:
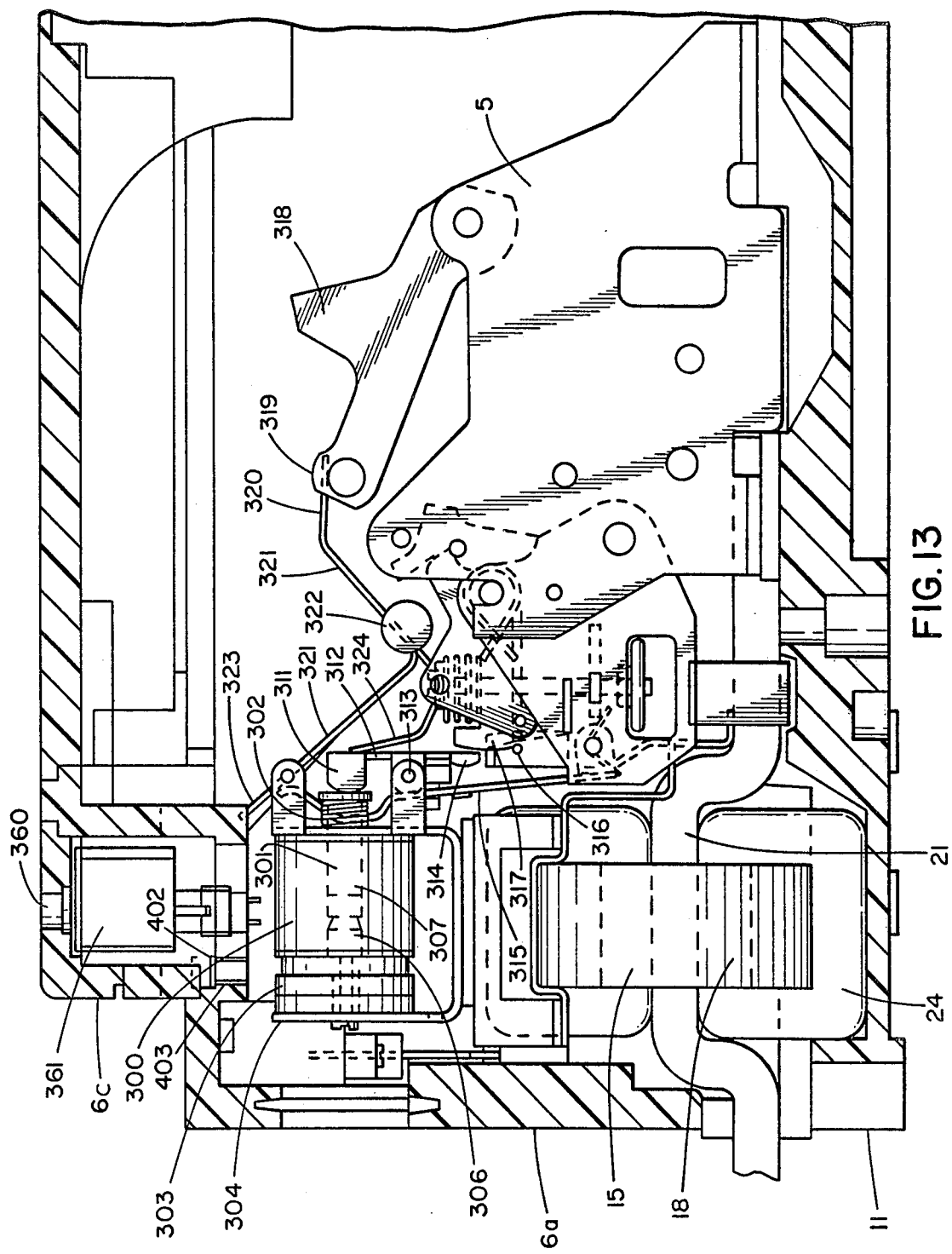
FIG. 13 is a fragmentary side elevation view of the circuit protective device in FIG. 11, with the tripping mechanism shown in its tripped position and the plunger of the delatching mechanism shown as moved to its reset position.
Figure 14:
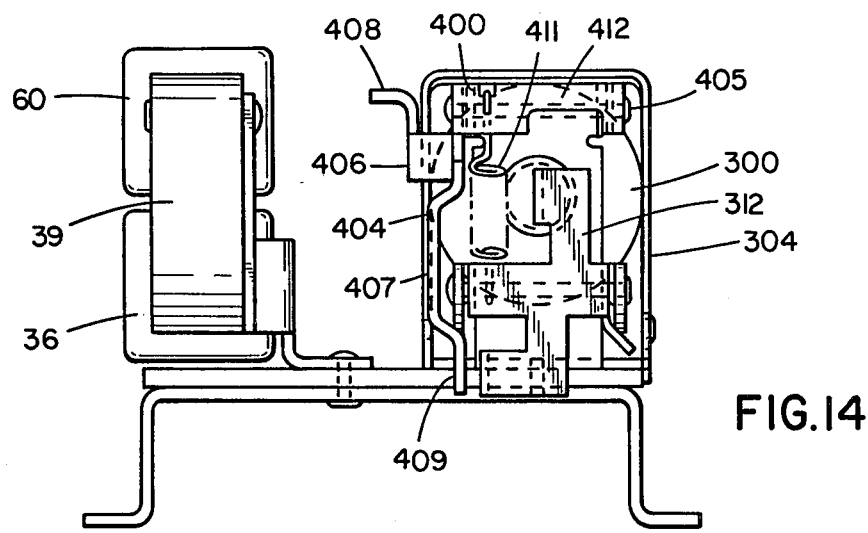
FIG. 14 is an end elevation view of the delatching mechanism and one of the step-up transformers of a circuit protective device in accordance with this invention.
Figure 15:
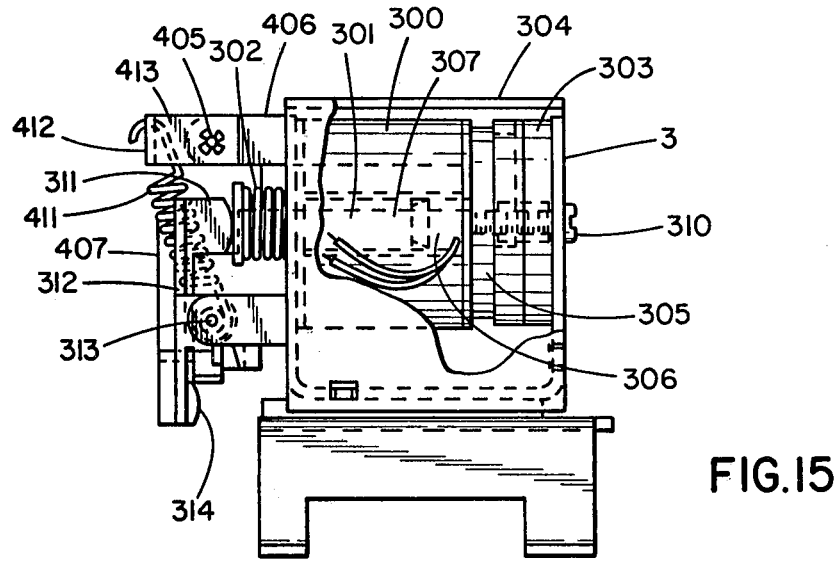
FIG. 15 is a side elevation view of the delatching mechanism shown in FIG. 14.
Figure 16:
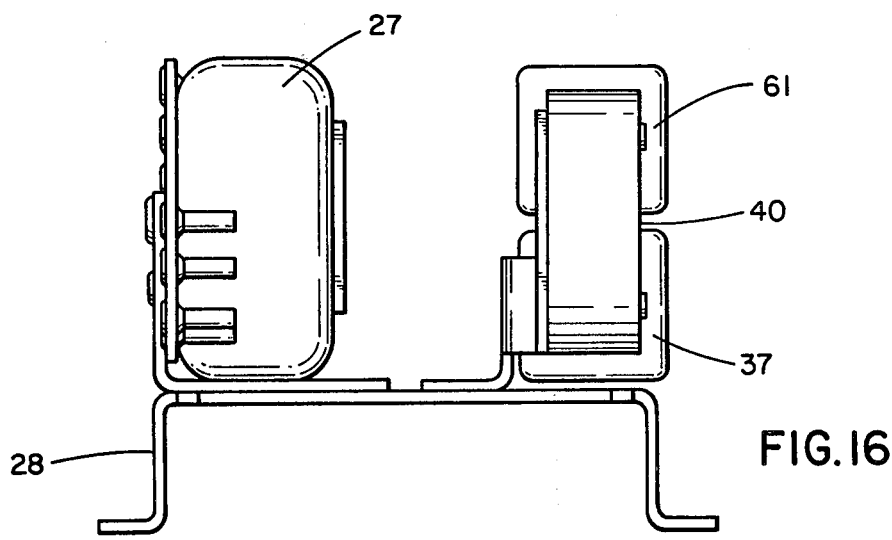
FIG. 16 is an end elevation view of the ground fault toroid and of a second step-up transformer of a current protective device in accordance with this invention.
Figure 21:
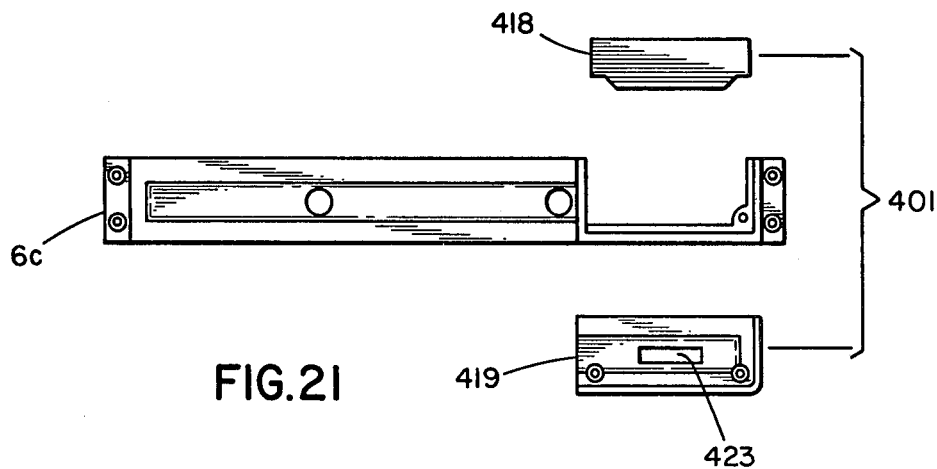
FIG. 21 is a plan view of the auxiliary cover and rating plug cover assembly of a circuit protective device in accordance with this invention.
Figure 22:
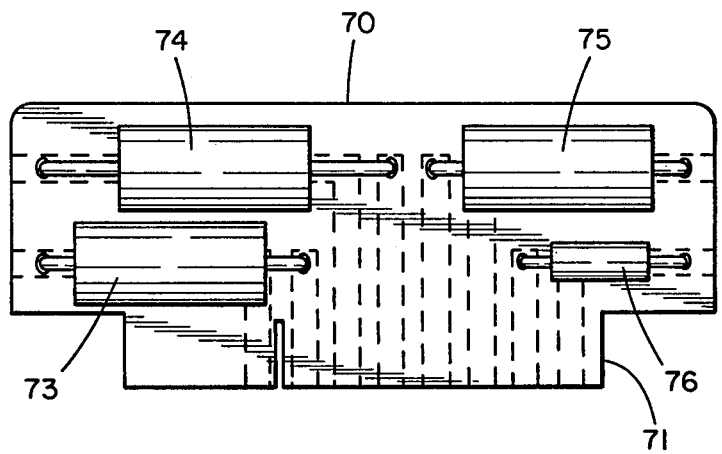
FIG. 22 is a side elevation view of one side of the rating plug of a circuit protective device in accordance with this invention.
Figure 23:
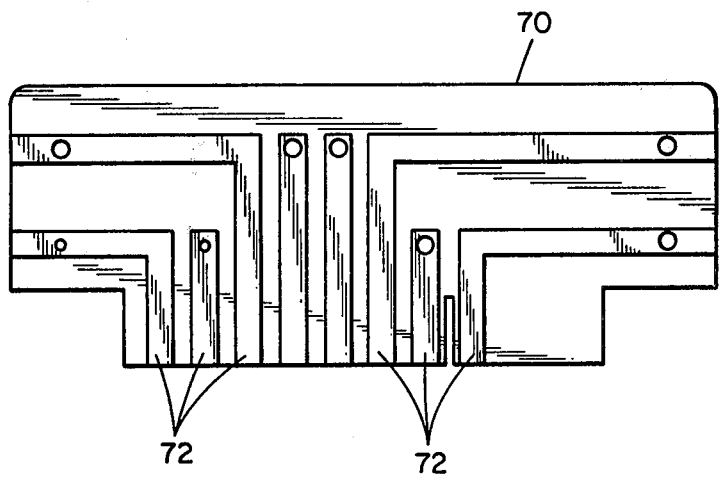
FIG. 23 is a side elevation view of the opposite side of the rating plug of FIG. 22.
Figure 25:
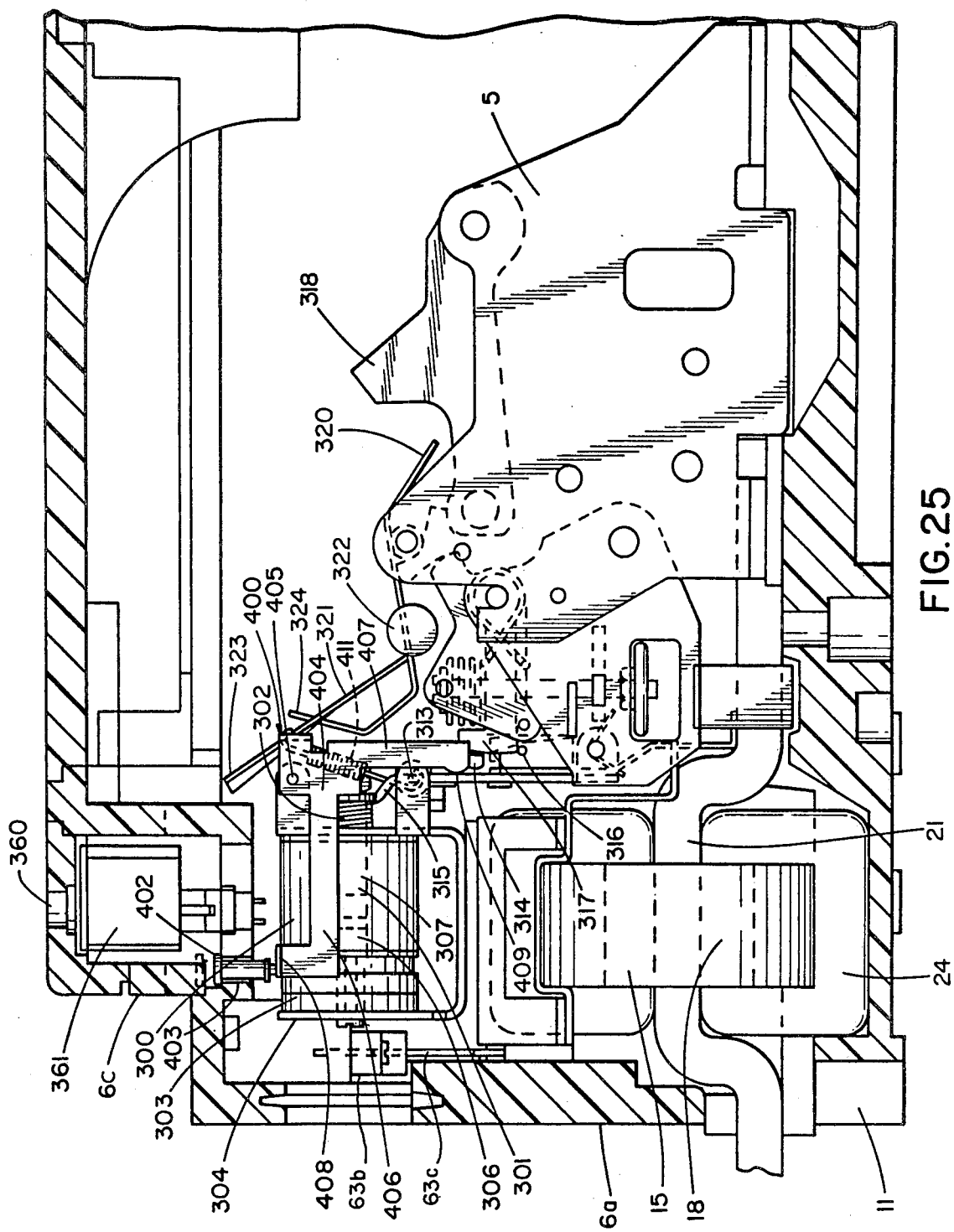
FIG. 25 is a fragmentary side elevation view of a circuit protective device in accordance with this invention, with the safety trip mechanism shown in the no-trip position.
Figure 26:
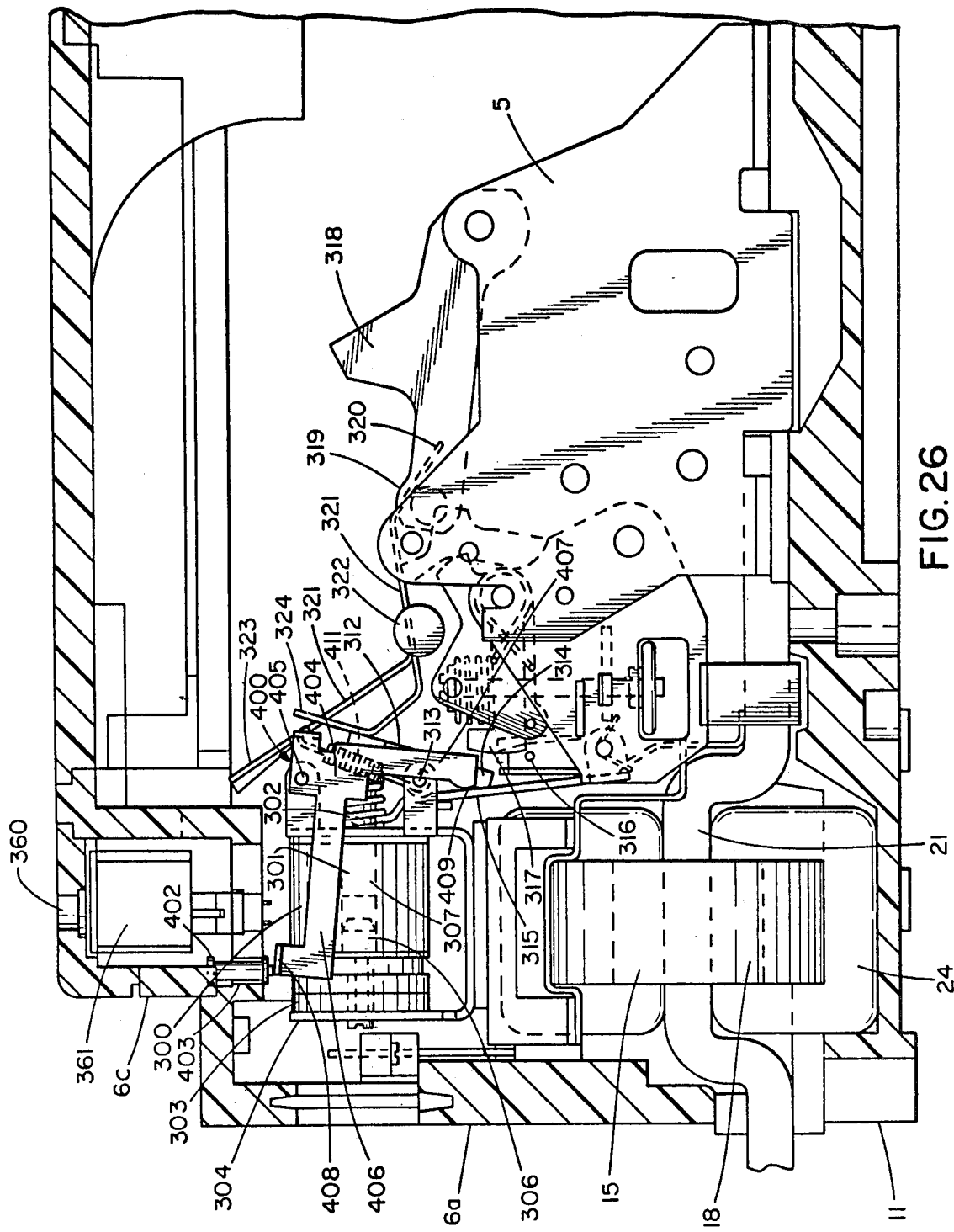
FIG. 26 is a fragmentary side elevation view of a circuit protective device in accordance with this invention, with the safety trip mechanism shown in the trip position and the tripping mechanisn shown just prior to moving to the tripped position.
Figure 27:
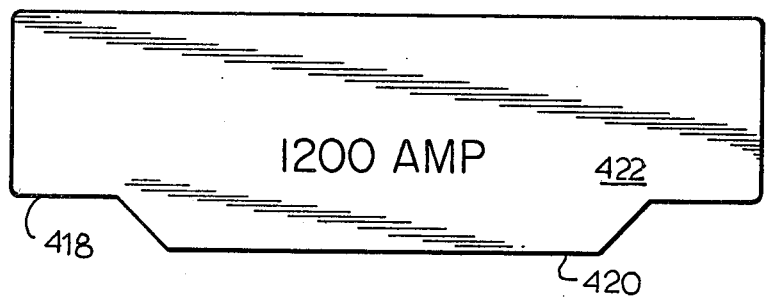
FIG. 27 is a top plan view of the rating plug cap portion of the rating plug cover assembly of FIG. 21.
Figure 28:
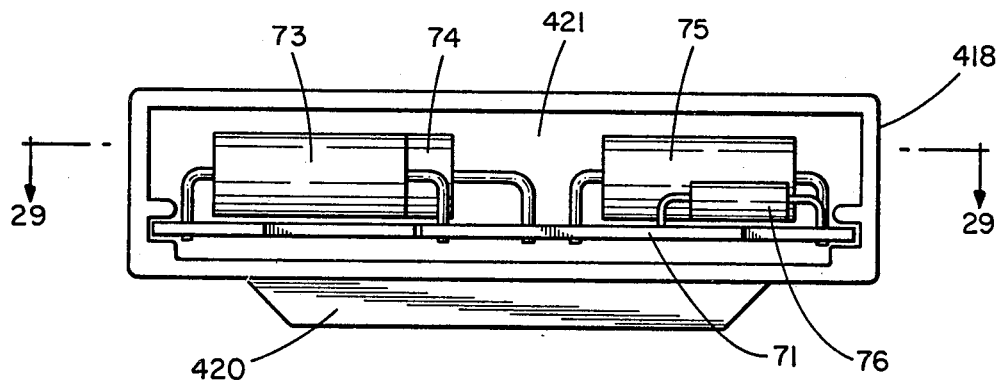
FIG. 28 is a bottom plan view of the rating plug cap shown in FIG. 27, with a rating plug shown therein.
Figure 29:
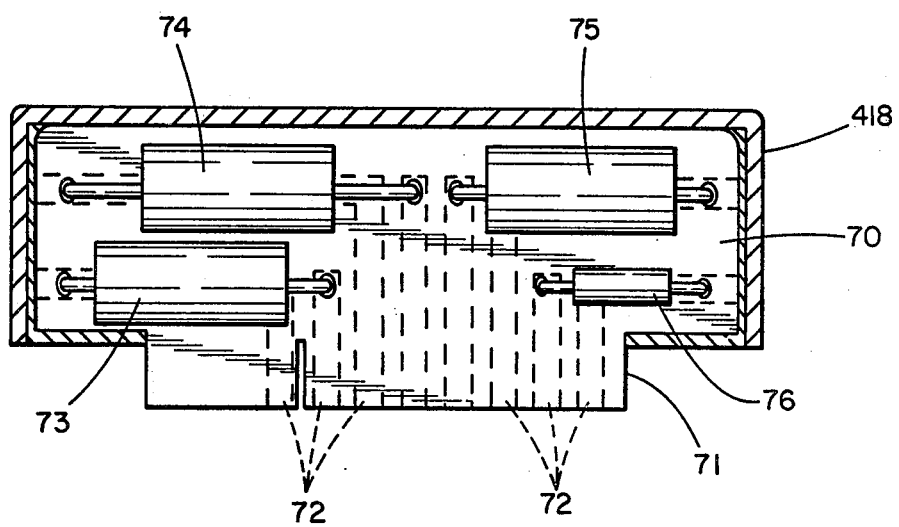
FIG. 29 is a section view taken on line 29—29 of FIG. 28.

When the breaker trips, the cradle 318 pivots clockwise as shown in the drawing (FIG. 13) and its rearward end portion 319 strikes the forward end portion 320 of spring lever 321, causing it to rotate a common trip shaft 322 in the unlatching direction. Three spring levers 321 are mounted on common trip shaft 322, one for each pole of the breaker. When trip shaft 322 is rotated by movement of the first spring lever 321 in the unlatching direction, the other two spring levers 321 of the other two poles of the breaker are also rotated causing the rearward end 323 to strike corresponding trip levers 315. There are also three trip levers 315, one positioned in each pole of the breaker, each having a latch pin 316 engaging a corresponding latch member 317. When respective spring levers 321 strike corresponding trip levers 315 moving them rearward, their corresponding latch pins 316 disengage from respective latch members 317 of each pole causing all poles of the breaker to trip whenever a fault of tripping magnitude and duration is sensed by the breaker.

A reset spring lever arm 324 is mounted on common trip shaft 322, being positioned to contact the first end portion 311 of rocker arm 312 from the forward side, i.e. the side opposite from that which is contacted by the head of armature 301. When trip shaft 322 is rotated in the unlatching position causing all poles of the breaker to trip, reset arm 324 is also being rotated to contact end portion 311 of rocker arm 312 moving it and armature 301 rearwardly to the reset position. In such position, the head of armature 301 compresses spring 302 and the shank of armature 301 is received within coil 300 until its rearward free end comes into close proximity with the flux concentrator 305. At such time, coil 300 is no longer energized and the magnetic field of permanent magnet 303 is thus strong enough to retain armature 301 in the reset or unlatched position until such time as the breaker is moved to the contact closed position again and another fault occurs to repeat the cycle.

A back-up or protective thermal tripping mechanism 350 is provided to trip the circuit breaker if the load conductors (internal bus bars 21, 22 and 23) become over-heated due to such causes as a poor electrical connection to the load or an unusually high ambient temperature. The electronic trip initiating circuits are input voltage dependent, and would not sense certain conditions which cause temperature rise in the breaker and distribution system but which do not necessarily affect input voltage.

The back-up thermal tripping mechanism 350 includes three bimetal strip members 351 bolted respectively to internal bus bars 21, 22 and 23, by connecting bolts 352, at locations which position the free end portions 353 of each bimetal strip member 351 for engagement respectively with a corresponding thermal release tab 354 projecting laterally from each of the three trip levers 315. When an over-temperature condition (not input voltage related) occurs of sufficient temperature to cause tripping of the breaker by the back-up thermal tripping mechanism 350, such as for example a load bus bar temperature of 130° C., the bimetal strip member in the particular pole involved will deflect until it contacts the corresponding thermal release tab 354 of its pole moving trip lever 315 rearwardly until its latch pin 316 disengages from latch member 317 of that pole, causing the breaker to trip as described above.

The internal ground fault trip indicator assembly includes a plunger type ground fault indicator armature 360 mounted in the bore of a ground fault indicator coil 361 and normally biased outwardly of the coil 361 by a helical compression spring 362. When the armature 360 is pushed inwardly of the coil 361, the shank end 363 of armature 360 narrows the gap between it and the pole end 364 of a flux concentrator 365 of soft iron, which enhances the attraction force of the magnetic field of a permanent magnet 366 mounted adjacent flux concentrator 365 on an iron frame 367. A non-magnetic screw 368 secures the assembly to a structural member of the circuit breaker 1. When the gap between the shank end 363 of armature 360 and pole end 364 of flux concentrator 365 is narrowed, the attraction force of the enhanced magnetic field of the permanent magnet 366 is sufficient to hold the armature 360 inwardly of coil 361 against the bias of spring 362.

Upon occurrence of a ground fault of sufficient magnitude to initiate tripping of the breaker, ground fault indicator coil 361 is energized as a result of capacitor 239 discharging through terminal 238, coil 361 and SCR 235. The magnetic field produced by such discharge through coil 361 opposes the magnetic field produced by the permanent magnet 366 and flux concentrator 365, in substantially the same manner as described above with respect to trip coil 300 and armature 301 of the delatching assembly 311. The magnetic field of the permanent magnet 366 is thus weakened until the bias of spring 362 is able to overcome the attraction force of the permanent magnet, enabling the spring 362 to move the armature 360 outwardly of the coil 361. The appearance of ground fault trip indicator armature 360 in such outward extended position visually indicates that the circuit breaker 1 has tripped because of a ground fault condition.

To reset, the armature 360 is pushed inwardly against the bias of spring 362 until the gap has narrowed sufficiently for the attraction force of the permanent magnet 366 to overcome the biasing force of the spring 362, thus holding the ground fault trip indicator armature 360 inwardly of coil 361 until another ground fault occurs of sufficient magnitude to trip the breaker.

The circuit breaker in accordance with this invention includes a shunt trip assembly, comprising a resistor 370 in conductor 371 connected at one end to first terminal 372 of trip coil 300 and a diode 373 in conductor 374 anode connected to second terminal 375 of trip coil 300. The opposite end of conductors 371 and 374 are connected to terminals 376 and 377 on terminal block 54. An external power source, such as a 120 volt one ampere alternating current supply, may then be connected to terminals 376 and 377 respectively, through appropriate switching means, to trip the circuit breaker from a remote location.

Resistor 370 limits current to the trip coil 300 to the magnitude required for generating a magnetic field in coil 300 in opposition to the field of permanent magnet 303 which is sufficient to allow spring 302 to bias trip armature 301 outwardly to the delatching position, as more fully described above. The current path from the external power source through the shunt trip assembly of this invention is through terminal 376 on terminal block 54 of the circuit breaker 1, conductor 371, resistor 370, first terminal 372 of trip coil 300, the trip coil 300, its second terminal 375, conductor 374, the anode of diode 373, the cathode of diode 373, terminal 377 on terminal block 54 back to the external power source.

The adjustment switches previously described, including ampere rating adjustment switch 98, short time delay pick-up adjustment switch 190, and ground fault time delay adjustment switch 231, include respective operating slide members 380, 381 and 382 which project through corresponding openings in the cover 2 of the circuit breaker 1 for external access. Users are thus able to set each of the adjustment switches 98, 190 and 231 to the respective positions described previously from the front of the circuit breaker without removing the cover, or disassembling any parts, or disconnecting the breaker from its installation.

Appropriate markings are also provided on the exterior of the cover 2, opposite each adjustment setting or position of each of the adjustment switches 98, 190 and 231.

The ampere rating adjustment switch 98 includes for example, the external markings 70%, 80%, 90%, and 100%, opposite the respective positions of operating slide member 380 to achieve a substantially precise pick-up level of the breaker at 70%, 80%, 90% and 100% respectively of the ampere rating of the breaker established by whatever one of the plurality of ampere rating plugs 70 has been inserted in terminal receiving member of the circuit breaker 1 as described previously herein. Thus, the user may set the ampere rating of the breaker externally by inserting the desired ampere rating plug 70, and he may also adjust the pick-up level externally by moving operating slide member 380 to the setting for the percentage of such ampere rating which the user desires. It is understood that for purposes of the invention, the percentages and magnitudes used herein are illustrative and are not intended to limit the scope of the invention. Other percentages and magnitudes may be established if desired.

The short time delay pick-up adjustment switch 190 includes, for example, the external markings 200%, 400%, 500% and 600% as shown in the drawing (FIG. 5) of the breaker used herein to describe the invention. The marking 200% is opposite the position of operating slide member 381 of switch 190 which establishes a pick-up level for the short time delay trip initiating circuit at an overcurrent fault condition of 200%. The marking 400% is opposite the switch position which establishes a pick-up level at a 400% overcurrent fault condition; the marking 500% opposite switch position for a 500% overcurrent fault condition; and marking 600% opposite switch position for a 600% overcurrent fault condition. Again, these settings are illustrative and do not limit the scope of the invention. Other settings and percentages may be established within the scope of this invention. Such settings and percentage levels of overcurrent fault conditions adjustable on the external cover of the breaker are substantially accurate and precise. When a user sets the switch 190 at the 200% marking he knows that the short time delay trip initiating circuit will initiate tripping at substantially precisely a 200% overcurrent fault condition, and so on at the 400%, 500% and 600% markings. The time delay adjustments (controlled by switch 190 and simultaneously adjusted when the overcurrent fault setting is adjusted) are also substantially precise enabling the user to set at a substantially precise level both the overcurrent pick-up level and time delay for each overcurrent setting externally of the breaker by merely setting a switch at the desired marking.

The ground fault time delay adjustment switch 231 includes for example the markings "0.1 sec", "0.2 sec", "0.3 sec," and "0.5 sec", as shown in the drawing (FIG. 5) for purposes of illustration. At the "0.1 sec" setting of switch 231, the ground fault trip initiating circuit will initiate tripping at substantially precisely one tenth of a second after occurrence of a ground fault of a magnitude above the level established by the ampere rating plug 70 being used at the time. At the "0.2 sec" setting of switch 231, the ground fault trip initiating circuit will initiate tripping at substantially precisely two-tenths of a second; at the "0.3 sec" setting, it will initiate tripping at substantially precisely three-tenths of a second; and at the "0.5 sec" setting, it will initiate tripping at substantially five-tenths of a second, after occurrence of a ground fault above the magnitude established by the other external controls (ampere rating plug 70 and ampere rating adjustment switch 98). A user may therefore easily and conveniently set the time delay for various magnitudes of ground fault conditions at substantially precise and determinable time periods set forth on the outside of cover 6b of the breaker by merely setting the switch 231 at the position opposite the desired time delay period. A separate meter or other measuring device is not needed, nor are special tools required to accomplish the adjustments and settings described herein.

The circuit breaker in accordance with this invention includes a safety trip mechanism 400 to trip the breaker if the rating plug cover assembly 6c is not in place. Such mechanism includes a push button 402 having a shaft portion 402b and a head portion 402a, mounted for reciprocal movement between a trip and no-trip position, in a port 403 provided in the circuit breaker cover 6b at a location adjacent the receiving member 63a in which the ampere rating plug 70 is inserted. The head portion 401a is of larger cross-sectional dimension than the shaft portion 402b.

A generally L-shaped safety trip lever 404 is pivotally mounted on pivot shaft 405 to a portion of the magnet frame 304, and includes a horizontally extending first leg 406 and a vertically extending second leg 407. The first leg 406 includes a free end offset planar tab portion 408 which is positioned for engagement by said push button 402 when said button is moved inwardly toward the no-trip position. The second leg 407 includes a free end projecting tab 409 for contact with a laterally extending safety trip tab 410 of the breaker trip lever 315, when the safety trip lever 404 is pivotally moved to the trip position.

The safety trip lever 404 is biased toward the trip position by helical extension spring 411, anchored at one end to a laterally extending pivot arm 412 of safety trip lever 404 and at the other end to pivot pin 313 on which rocker arm 312 is pivotally mounted. A flange 413 extends at substantially a right angle from the free end portion of laterally extending arm 412. The pivot shaft is mounted through aligned apertures 414 (in the flange 413) and 415 (in a corresponding portion of the spaced apart first leg 406 of the safety trip lever 404). The pivot shaft also extends through corresponding apertures in spaced apart legs 416 and 417 of a bracket portion of magnet frame 304.

When rating plug cover assembly 401 is removed, push button 402 is uncovered and free to move from the no-trip position to the trip position. The spring 411 biases the safety trip lever 404 toward the trip position wherein the vertically extending second leg 407 moves into engagement with the breaker trip lever 315 causing the breaker to trip. At such time the horizontally extending first leg 406 is moved into bearing engagement against push button 402 moving it from the no-trip to the trip position. The circuit breaker cannot be reset until the push button 402 is moved in the opposite direction back to the no-trip position, which occurs when the rating plug cover assembly 6c is put in place after insertion of an ampere rating plug 70.

The ampere rating cover assembly 401 includes a rating plug 418 and a rating plug cover 423 having an outer jacket or casing 419. Cover 423 is attached to auxiliary cover 6c. Cover 6c engages the push button 402 of the safety trip mechanism pushing it inwardly to the non-trip position. The ampere rating of the particular rating plug is printed on the top wall 422 of 418 and centrally located thereon. When the rating plug 70 is inserted into terminal receiving member 63a, which defines a passage in the cover receiving the plug carrying the plurality of ampere rating resistors, to make the ampere rating adjustment assembly 63 operative as described previously herein, the rating plug cap 418 is placed over the rating plug 70. A projecting edge portion 420 of rating plug cap 418 engages the push button 402 of the safety trip mechanism 400 pushing it inwardly to the no-trip position. The rating plug cap 418 includes a recess 421 to receive the outwardly projecting portion of rating plug 70 therein when cap 418 is put in place over the plug 70. The ampere rating of the particular rating plug is printed on the top wall 422 of cap 418 and centrally located thereon.

The outer casing 419 of cover assembly 401 includes a central aperture 423 through which the ampere rating of plug 70 printed on the top wall 422 thereof is visible when outer casing 419 is put in place over rating plug cap 418. The outer casing 419 is secured by screws to auxiliary cover 6(c), which is provided on cover 6(b) for access to the terminal block 54 and to the ground fault trip indicator 360. The outer jacket or casing 419 retains the rating plug cap 418 in place until it is desired to remove the ampere rating plug 70.

We claim:

1. A circuit protective device to detect high fault currents and ground fault currents in an electrical power circuit and protect said power circuit, comprising:
   a plurality of conductors including phase conductors and a ground return neutral conductor,
   separable contact means for each conductor,
   transformer means for each conductor, each transformer means including a current transformer having a respective step up transformer and a differential transformer common to each current transformer with the secondary of each current transformer connected through a respective primary of said differential transformer to the primary of the respective step up transformer, a first respective d.c. bridge connected to the secondary of each step up transformer, and a last d.c. bridge connected to the secondary of said differential transformer, the bridges having a common ground with the first bridges having a d.c. output level corresponding to the current in said conductors including a high fault current and said differential transformer having an output corresponding to the ground fault current in said neutral conductor,
   circuit interruption means operable to separate said contact means and interrupt said power circuit on occurrence of a fault current in any conductor,
   a first coil having one terminal connected directly in common to each first bridge for energization in response to both a high fault current and a ground fault current to operate said circuit interruption means,
   a second ground fault coil having one terminal connected to said last bridge for energization in response to a ground fault current,
   solid state means connected to each d.c. bridge for energization by the d.c. output of said bridges and controlled by the d.c. output level of the first bridges and said last bridge corresponding to a respective fault current to provide a respective fault signal, said solid state means including a respective gated semiconductor device connected to the respective other terminal of each coil, said solid state means rendering both of said devices conductive in response to a fault signal corresponding to a ground fault current to energize each coil and rendering one device conductive in response to a fault signal corresponding to a high fault current to energize said first coil, said energized first coil operating said interruption means to separate said contact means and indicate a fault condition,
   a base carrying said conductors, contact means, transformer means, circuit interruption means and said first coil,
   a cover carrying said solid state means, bridges and second coil,
   means connecting the other terminal of said first coil to the respective semiconductor device and said bridges to a respective secondary in response to the engagement of said cover with said base in overlapping relationship to said circuit interruption means, transformer means, first coil and contact means,
   other ground fault trip indicating means including visual indication means visible from the exterior of said cover and operated by said second energized ground fault coil,
   and last means establishing one connection through said cover from the output of the last ground fault bridge and establishing another connection through said cover from said solid state means to enable the energization of a remote indicator by the output of said last bridge in response to the energization of said second coil by conductance of the respective semiconductor device.

2. A circuit protective device as set forth in claim 1, wherein said first ground fault trip indicating means includes a coil connected to said solid state ground fault interruption initiating means, an armature operatively associated with one end of said coil for movement between a trip indicating and non-trip indicating position, a spring biasing said armature toward said trip indicating position, a permanent magnet located adjacent the other end of said coil opposite said armature, and a magnetically susceptible material extending partially through said coil to hold said armature in said non-trip indicating position when said armature is mechanically moved to said non-trip indicating position, the magnetic field produced by said coil upon receiving a ground fault trip signal from said ground fault trip interruption initiating means opposing the magnetic field of said permanent magnet thereupon reducing its attraction force sufficiently to allow said spring to overcome said attraction force and move said armature to said trip indicating position.

3. The circuit protective device as claimed in claim 1, wherein said last means other connection includes:
a capacitor having one plate connected to the juncture between said second coil other terminal and the respective gated semiconductor device to apply said common ground to said one plate in response to conduction of the respective device and the other plate is connected to the respective cover connection,
and a rectifier connected between the other capacitor plate and said common ground for preventing the flow of current from said common ground to said other plate in response to conductance of said respective device and energization of said coil whereby a selected voltage is generated across the capacitor plates for application through said cover in response to conductance of the respective semiconductor device and energization of the respective second coil.

4. The protective device claimed in claim 1 in which said differential transformer includes a last primary winding and said cover includes means for connecting a current sensing transformer associated with a remotely located neutral conductor to said last primary winding of said differential transformer.

* * * * *

UNITED STATES PATENT AND TRADEMARK OFFICE
CERTIFICATE OF CORRECTION

PATENT NO. : 4,208,690

DATED : June 17, 1980

INVENTOR(S) : J. P. McGinnis & H. J. Zylstra

It is certified that error appears in the above—identified patent and that said Letters Patent is hereby corrected as shown below:

Col. 4, line 53, "transformers" should read --transformer--.
Col. 5, line 22, "transformers" should read --transformer--.
Col. 6, line 17, "am" should read --an--.
       line 58, "transformers" should read --transformer--.
Col. 11, line 36, "the pulse" should read --that the pulse--.
Col. 15, line 38, "capacitor 193" should read --capacitor 183--.
Col. 17, line 40 "1.5 LVolts" should read --1.5 volts--.

Signed and Sealed this

Seventeenth Day of August 1982

[SEAL]

Attest:

Attesting Officer

GERALD J. MOSSINGHOFF

Commissioner of Patents and Trademarks